(12) United States Patent
Koyama et al.

(10) Patent No.: US 12,259,469 B2
(45) Date of Patent: Mar. 25, 2025

(54) OBJECT DETECTION DEVICE

(71) Applicants: SOKEN, INC., Nisshin (JP); DENSO CORPORATION, Kariya (JP)

(72) Inventors: Yu Koyama, Nisshin (JP); Mitsuyasu Matsuura, Nisshin (JP); Hideki Otsuka, Kariya (JP)

(73) Assignees: SOKEN, INC., Nisshin (JP); DENSO CORPORATION, Kariya (JP)

( * ) Notice: Subject to any disclaimer, the term of this patent is extended or adjusted under 35 U.S.C. 154(b) by 235 days.

(21) Appl. No.: 17/349,606

(22) Filed: Jun. 16, 2021

(65) Prior Publication Data

US 2021/0311190 A1 Oct. 7, 2021

Related U.S. Application Data

(63) Continuation of application No. PCT/JP2019/043680, filed on Nov. 7, 2019.

(30) Foreign Application Priority Data

Dec. 18, 2018 (JP) ................... 2018-236663

(51) Int. Cl.
*G01S 15/931* (2020.01)
*G01S 7/523* (2006.01)
(Continued)

(52) U.S. Cl.
CPC ............ *G01S 15/931* (2013.01); *G01S 7/523* (2013.01); *G01S 15/104* (2013.01); *G01S 15/582* (2013.01)

(58) Field of Classification Search
CPC ...... G01S 15/931; G01S 7/523; G01S 15/104; G01S 15/582; G01S 7/527; G01S 7/539; G01S 13/00; G01S 15/00; G01S 17/00; G01S 15/04; G01S 7/52006; G01S 7/524; G01S 7/526; G01S 15/885; G01S 2007/52007; G01S 7/5276; G01S 7/529; G01S 7/53; G01S 15/42; G01S 15/586;
(Continued)

(56) References Cited

U.S. PATENT DOCUMENTS

2005/0072227 A1* 4/2005 Carter .................. G01S 7/5273
73/290 V
2009/0009306 A1 1/2009 Magane et al.
(Continued)

FOREIGN PATENT DOCUMENTS

CN 102109600 B * 2/2013
CN 106922175 A * 7/2017 ......... B60R 21/0134
(Continued)

*Primary Examiner* — James J Yang
*Assistant Examiner* — Anthony D Afrifa-Kyei
(74) *Attorney, Agent, or Firm* — Maschoff Brennan

(57) ABSTRACT

In an object detection device, a signal generation unit generates a drive signal, a transmission unit transmits an ultrasonic wave as a search wave in response to the input drive signal, and a reception unit receives an ultrasonic wave to generate a received signal. A judging unit performs object detection determination based on the received signal. The drive signal has at least two frequencies, and the judging unit extracts at least two amplitudes corresponding to the at least two frequencies from the received signal, and performs determination based on a relationship between the at least two amplitudes.

13 Claims, 20 Drawing Sheets

(51) Int. Cl.
*G01S 15/10* (2006.01)
*G01S 15/58* (2006.01)

(58) Field of Classification Search
CPC ................. G01S 15/87; G01S 7/52004; G01S 2015/938; G01K 3/00; G01K 5/00; G01K 7/00; G01K 9/00; G01K 11/22; G01K 11/00; G01K 11/24; G01K 11/26
See application file for complete search history.

(56) References Cited

U.S. PATENT DOCUMENTS

| | | |
|---|---|---|
| 2010/0220550 A1 | 9/2010 | Akiyama et al. |
| 2015/0078130 A1 | 3/2015 | Urban et al. |
| 2015/0268335 A1 | 9/2015 | Nakano et al. |
| 2018/0329044 A1 | 11/2018 | Nomura et al. |
| 2019/0277967 A1* | 9/2019 | Ogawa .................... G01S 15/04 |
| 2020/0025917 A1* | 1/2020 | Kozuki .................... G01S 15/89 |

FOREIGN PATENT DOCUMENTS

| | | | | |
|---|---|---|---|---|
| DE | 10 2010 015 077 A1 | 10/2011 | | |
| DE | 10 2015 111 264 A1 | 1/2017 | | |
| GB | 2402484 A | * 12/2004 | ........... | B06B 1/0223 |
| JP | 56-041069 B2 | 9/1981 | | |
| JP | 2007-003369 A | 1/2007 | | |
| JP | 2009-265009 A | 11/2009 | | |
| JP | 5334342 B1 | 11/2013 | | |
| JP | 2014-132220 A | 7/2014 | | |
| WO | WO-2018019696 A1 | * 2/2018 | | |

\* cited by examiner

OBJECT DETECTION DEVICE

CROSS REFERENCE TO RELATED APPLICATION

The present application is based on Japanese Patent Application No. 2018-236663 filed on Dec. 18, 2018, the contents of which are incorporated herein by reference.

BACKGROUND

Technical Field

The present disclosure relates to an object detection device configured to detect an object by transmitting and receiving ultrasound waves.

Related Art

A known object detection device that can distinguish an obstacle with a small height such as a wheel chock from an obstacle with a large height such as a wall includes a transmitter/receiver, a peak detection unit, a difference calculation unit, and an object determination unit.

The transmitter/receiver is mounted on the vehicle at a certain height and is directed outward. The transmitter/receiver includes transmitting means for repeatedly transmitting search waves at predetermined intervals and receiving means for receiving the reflected waves of the search waves arriving from the direction of the detection area after being reflected by the object to be detected. The peak detection unit detects the peak values of the reflected waves received by the receiving means of the transmitter/receiver and stores the detected peak values. The difference calculation unit calculates the difference between peak values detected by the peak detecting means as the vehicle moves closer to the object to be detected.

When the value of the peak value difference calculated by the difference calculation unit is a "negative" value, the object determination unit determines that the type of the detected object is "obstacle near the road surface". An "obstacle near the road surface" is an obstacle existing near the road surface. Further, the object determination unit determines that the type of the detected object is "obstacle of another type (or other obstacles)" when the difference value is a "positive" value. An "obstacle of another type" is an obstacle existing at a position higher than near the road surface.

DESCRIPTION OF SPECIFIC EMBODIMENTS

Figure 1:
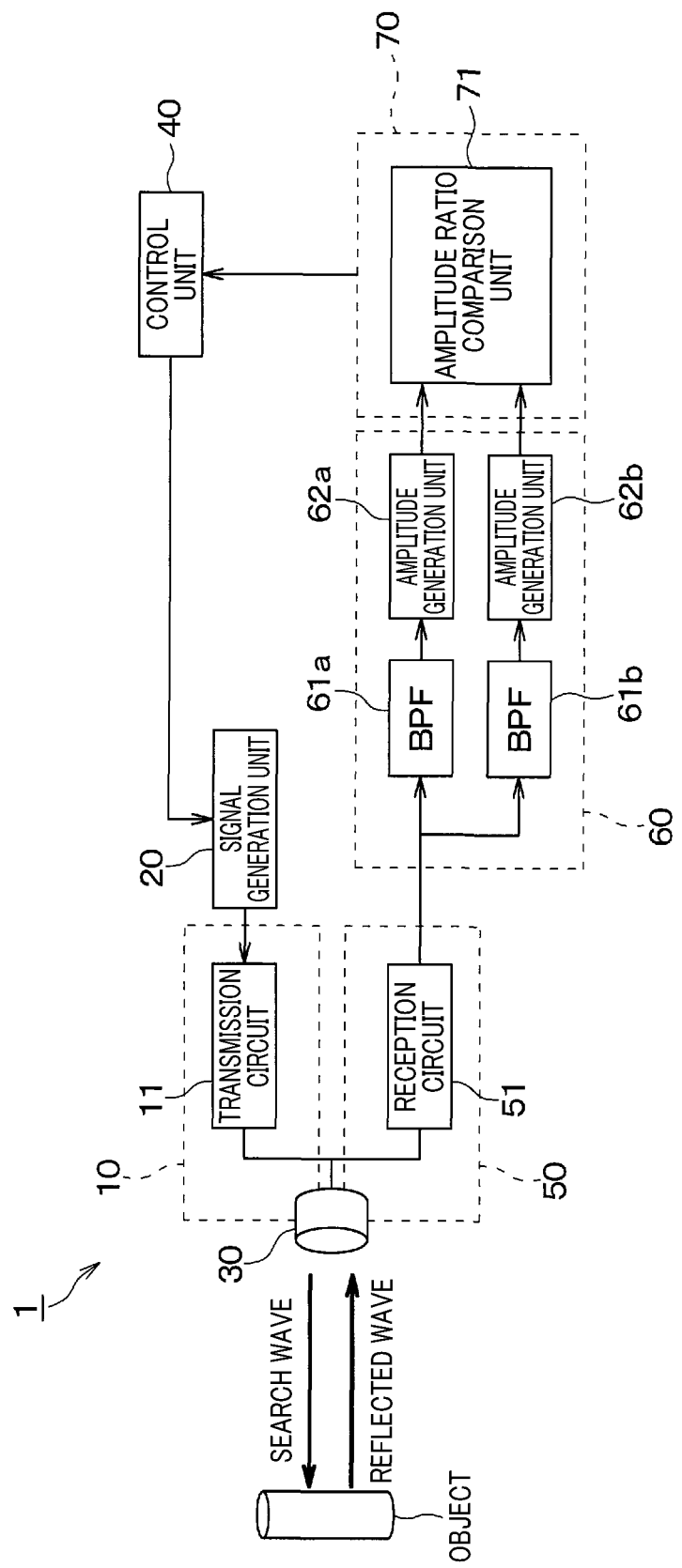
FIG. 1 shows the configuration of an object detection device according to a first embodiment.

In the above known object detection device, as disclosed in JP-A-2010-197351, the transmitting means of the transmitter/receiver transmits search waves at predetermined intervals. The receiving means receives the reflected waves arriving from the direction of the detection area. The peak detection unit detects the peak values of the reflected waves received by the receiving means and stores them. The difference calculation unit calculates the differences between peak values which change as the vehicle moves closer to the object to be detected. When the value of the calculated peak value difference is a "negative" value, the object determination unit determines that the type of the detected object is an obstacle near the road surface. On the other hand, the object determination unit determines that the type of the detected object is an obstacle of another type when the calculated difference value is a "positive" value.

It is desirable that this kind of device has a further improved accuracy in distinguishing objects. Specifically, for example, it is assumed that the object detection device is mounted on a vehicle. In this case, an object such as a wall having a relatively large protrusion height from the road surface is likely to come into contact with the vehicle body. Therefore, such an object needs to be properly recognized as an obstacle. On the other hand, an object such as a wheel chock whose protrusion height from the road surface is sufficiently small is very unlikely to come into contact with the vehicle body. Therefore, such an object is substantially not evaluated as an obstacle. The same applies to objects such as beams that slightly project downward from the ceiling. Therefore, in the case of a vehicle-mounted object detection device, it is required to accurately distinguish objects that are likely to come into contact with the vehicle body and thus likely to be obstacles from other objects.

In view of the foregoing, it is desired to have an object detection device capable of improving the accuracy of object determination.

One aspect of this disclosure provides an object detection device including: a signal generation unit which generates a drive signal; a transmission unit which transmits an ultrasonic wave as a search wave in response to the input drive signal; a reception unit which receives an ultrasonic wave to generate a received signal; and a judging unit which performs object detection determination based on the received signal. According to the one aspect of the present disclosure, the drive signal has at least two frequencies. The judging unit extracts at least two amplitudes corresponding to the at least two frequencies from the received signal, and performs determination based on a relationship between the at least two amplitudes.

The directivity of an ultrasound wave changes with frequency. Therefore, the amplitudes of received signals of reflected waves from an object corresponding to at least two different ultrasonic waves having different directivity change depending on the positional relationship between the object and the directivity range which corresponds to the directivity. Specifically, for example, there may be an object that is in the directivity range of an ultrasonic wave having wide directivity but outside the directivity range of an ultrasonic wave having narrow directivity. In this case, there will be a large difference in the amplitude of the received signal between the reflected wave of the ultrasonic wave having wide directivity and the reflected wave of the ultrasonic wave having narrow directivity. On the other hand, the object may exist in a zone where the directivity range of the ultrasonic wave having wide directivity and the directivity range of the ultrasonic wave having narrow directivity overlap. In this case, there is no significant difference in the amplitude of the received signal between the reflected wave of the ultrasonic wave having wide directivity and the reflected wave of the ultrasonic wave having narrow directivity.

Therefore, the object detection device according to the one aspect of the present disclosure transmits an ultrasonic wave having at least two frequencies as a search wave, extracts the amplitude for each frequency from the received signal, and makes an object detection determination based on the relationship between the at least two amplitudes. Specifically, for example, the judging unit compares the at least two extracted amplitudes. This makes it possible to perform object detection determination with high accuracy. Specifically, this makes it possible to distinguish between obstacle objects and other objects with good accuracy. For example, objects that are likely to come into contact with the vehicle body can be distinguished from other objects. In addition, the influence of changes in the amplitude level due to atmospheric fluctuation and the like can be reduced by performing the object detection determination based on the amplitudes of the received signals corresponding to two or more frequencies. Therefore, according to such a configuration, it is possible to further improve the accuracy of object determination as compared with the conventional techniques.

Embodiments of the present disclosure will be described below with reference to the drawings. In the following embodiments, parts of an embodiment that are the same or equivalent to parts of another embodiment are assigned with the same reference signs.

FIRST EMBODIMENT

The first embodiment will be described. As shown in FIG. 1, an object detection device 1 of this embodiment includes a transmission unit 10, a signal generation unit 20, a transmitter/receiver 30, a control unit 40, a reception unit 50, a frequency separation unit 60, and a signal judging unit 70. The object detection device 1 is an ultrasonic sonar device mounted on a vehicle to detect an object outside the vehicle.

The transmission unit 10 transmits ultrasonic waves as search waves. Output signals of the signal generation unit 20 are input to the transmission unit 10, and the transmission unit 10 transmits search waves in accordance with the drive signals input from the signal generation unit 20. The drive signal is an electric signal for driving the transmitter/receiver 30, and has a frequency corresponding to the frequency of the search wave.

Specifically, the signal generation unit 20 generates a pulse signal having a frequency in the ultrasonic band as a drive signal. As shown in FIG. 1, the transmission unit 10 includes a transmitter/receiver 30 and a transmission circuit 11. A drive signal generated by the signal generation unit 20 is input to the transmission circuit 11. The transmission circuit 11 processes the input drive signal including, for example, stepping up its voltage, and outputs the signal generated thereby. The output signal of the transmission circuit 11 is input to the transmitter/receiver 30. Then, the transmitter/receiver 30 transmits a search wave in response to the input signal toward the outside of the vehicle. The transmitter/receiver 30 includes, for example, a microphone provided with an electro-mechanical conversion element (for example, a piezoelectric element) that is excited by being driven by a drive signal.

The signal generation unit 20 receives transmission instructions, drive-signal setting information, and the like from the control unit 40. The control unit 40, the distance determination unit 70, and the like are configured by a known microcomputer including, for example, a CPU, ROM, RAM, I/O, and the like, and execute processing such as various calculations according to programs stored in the ROM or the like. "ROM or the like" includes a rewritable non-volatile memory such as an EEPROM. ROM and RAM are non-transitory tangible storage media.

The reception unit 50 receives ultrasonic waves and generates received signals in accordance with the sound pressure of the received waves. The received signals generated by the reception unit 50 are processed by the frequency separation unit 60 and then input to the signal judging unit 70 to be used in the object detection process performed at the signal judging unit 70.

Specifically, the reception unit 50 includes a transmitter/receiver 30 and a reception circuit 51. The transmitter/receiver 30 outputs a voltage corresponding to the sound pressure of the received wave, and the receiving circuit 51 generates and outputs a received signal by processing the output voltage of the transmitter/receiver 30 including, for example, amplifying the output voltage. The received signal generated by the reception circuit 51 is input to the frequency separation unit 60. The frequency separation unit 60 processes the received signal, for example, applies a filter, and outputs the signal generated thereby. The signal judging unit 70 is configured to determine whether an object has been detected based on the received signal. The determination result of the signal judging unit 70 is transmitted to the control unit 40.

According to the object detection device 1 having such a configuration, for example, the object detection process is performed as follows. When a transmission instruction is issued from the control unit 40 to the signal generation unit 20, the signal generation unit 20 generates a drive signal, and the transmission unit 10 transmits a search wave according to the drive signal. When the search wave is reflected by an object outside the vehicle, the reception unit 50 receives the reflected wave and generates a received signal. The signal judging unit 70 detects an object based on the received signal, measures the distance to the object based on the time from transmission of the search wave to reception of the reflected wave, i.e., the TOF, and sends the detection result and the like to the control unit 40. TOF is an abbreviation for Time of Flight.

With such a method of detecting an object based on the TOF, it is difficult to accurately determine the position of the object because only the linear distance between the object that has reflected the search wave and the vehicle is measured. For example, it is difficult to determine whether the detected object is an obstacle such as a wall that may collide with the vehicle body, or an object such as a small bump that is unlikely to collide with the vehicle body. In regard to this, the researchers involved in the present disclosure focused on the relationship between the frequency and directivity of the ultrasonic search waves, and devised a configuration that enables distinguishing obstacle objects from other objects.

Figure 2:
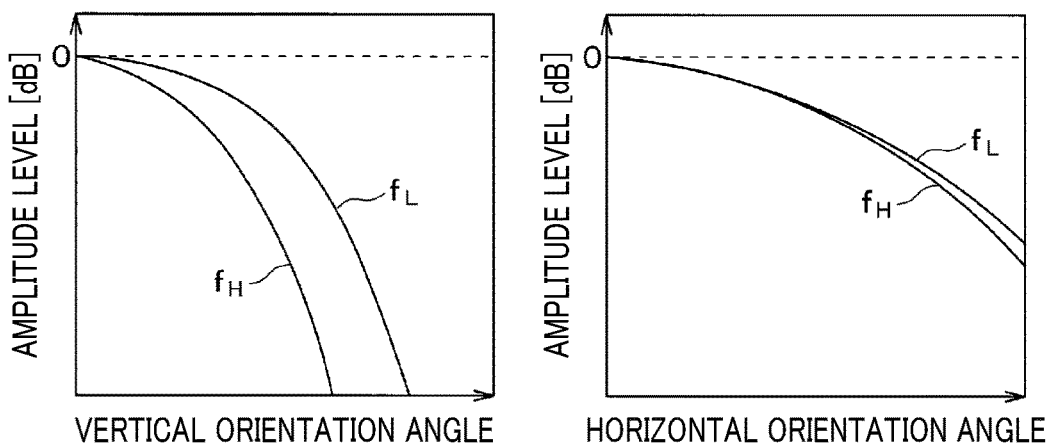
FIG. 2 is a diagram showing the directivity of a transmitter/receiver.
Figure 3:
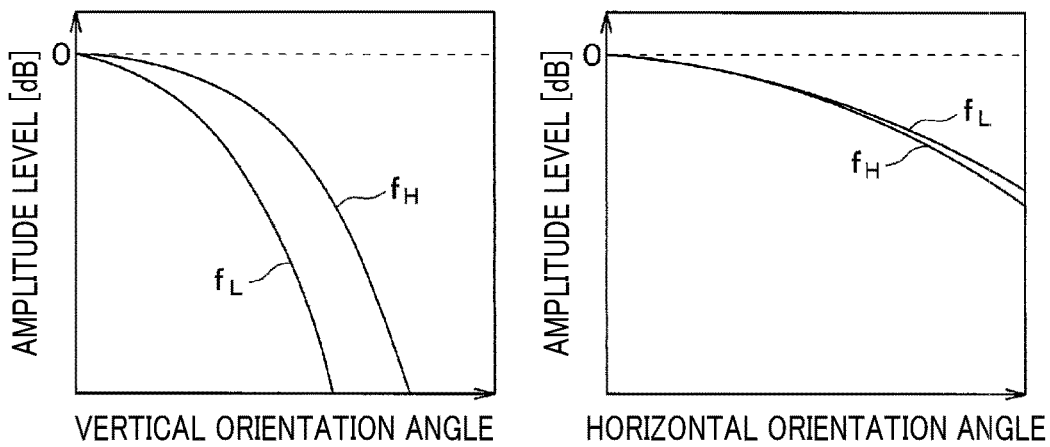
FIG. 3 is a diagram showing the directivity of a transmitter/receiver.

First, the relationship between the frequency and directivity of search waves will be described. As shown in FIG. 2 or 3, for example, the transmitter/receiver 30 including components such as a microphone has such a directivity characteristic that the amplitude level of the search wave decreases as the vertical orientation angle and the horizontal orientation angle increase. In FIGS. 2 and 3, the broken line represents the amplitude level when the orientation is 0°. Further, in FIG. 4, "road surface protrusion" refers to a protrusion such as a wheel chock whose height from the surface of a path is sufficiently small. Further, "ceiling protrusion" refers to a protrusion whose height from the ceiling is sufficiently small, such as a beam slightly protruding downward from the ceiling of a path. It is not so necessary to recognize or detect these objects as "obstacles" that may collide with the vehicle body.

Figure 4:
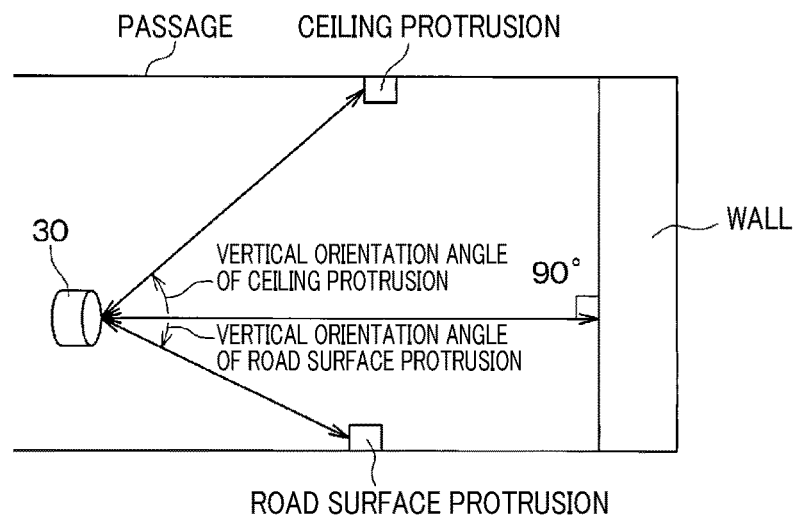
FIG. 4 is a diagram for explaining the relationship between the position of an object and its vertical orientation angle.

As shown in FIG. 4, the vertical orientation angle is defined by an angle between the horizontal plane passing through the transmitter/receiver 30 and a straight line connecting the transmitter/receiver 30 and the object. The vertical orientation angle of an object that returns the reflected wave from the front of the transmitter/receiver 30, for example, an object such as a wall in front of the transmitter/receiver 30, is 0°. The vertical orientation angle of a protrusion on the road surface at a height that is different from that of the transmitter/receiver 30, and the vertical orientation angle of a protrusion such as a beam below the ceiling of a passage are larger than 0°.

The amplitude level of a search wave traveling from the transmitter/receiver 30 toward a height that is different from that of the transmitter/receiver 30 is smaller than that of a search wave traveling in a direction parallel to the horizontal plane. Therefore, the amplitude level of the reflected wave from an object located in front of the transmitter/receiver 30 is smaller than the amplitude level of the reflected wave from an object located at a height different from that of the transmitter/receiver 30.

It is known that the directivity characteristics change depending on the size of the transmission surface of the transmitter/receiver 30, the wavelength of the transmitted wave, the vibration mode of the transmission surface, and the like. That is, when the size of the transmission surface is constant, the directivity can be changed by changing the frequency of the transmitted signal. In general, when the vibration modes are the same, the higher the frequency, the narrower the directivity. The vibration modes are often the same when the frequency difference is small. In contrast, when the frequency difference is large, the vibration mode may change. In this case, the relationship between the frequency (high-low) and the width of the directivity (narrow-wide) may be inverted.

Specifically, depending on the configuration of the transmitter/receiver 30, for example, as shown in FIG. 2, the directivity of a frequency $f_L$ lower than a frequency $f_H$ is wider than the directivity of the frequency $f_H$. Further, depending on the configuration of the transmitter/receiver 30, for example, as shown in FIG. 3, the directivity of the frequency $f_L$ is narrower than the directivity of the frequency $f_H$.

The larger the vertical orientation angle, the larger the difference in directivity due to the difference in frequency, and the smaller the vertical orientation angle, the smaller the difference in directivity due to the difference in frequency. That is, the larger the vertical orientation angle of the object, the larger the difference in the amplitude level of the reflected waves due to the difference in frequency, and the smaller the vertical orientation angle of the object, the smaller the difference in the amplitude level of the reflected waves due to the difference in frequency.

In the case of the vehicle-mounted object detection device 1 implemented by attaching a sonar to the vehicle, the device is configured so that the vertical directivity will be narrow and the horizontal directivity will be wide. In this case, as shown in FIGS. 2 and 3, the difference in directivity due to the difference in frequency appears in the vertical direction, whereas the difference in the horizontal direction is small.

Figure 5:
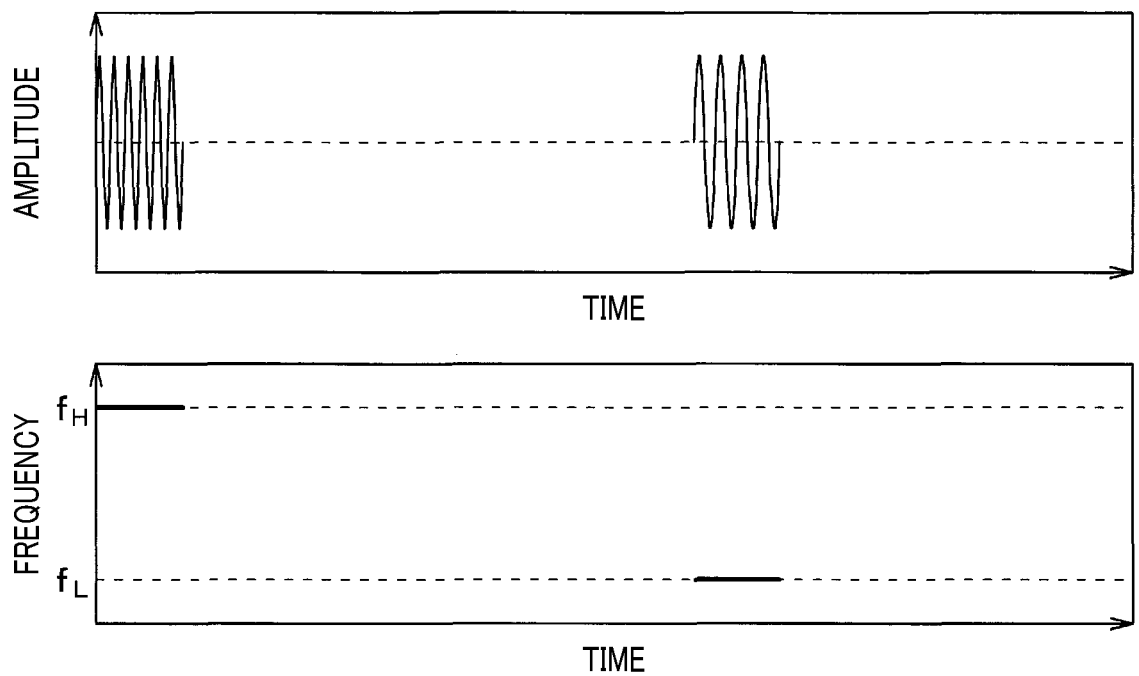
FIG. 5 shows graphs of the amplitude and frequency of a drive wave.

Next, a configuration that enables distinguishing obstacle objects from other objects will be described. The signal generation unit 20 of this embodiment generates drive signals having at least two frequencies. Specifically, for example, as shown in FIG. 5, the signal generation unit 20 intermittently generates a signal having a frequency $f_H$ and a signal having a frequency $f_L$.

Further, as shown in FIG. 1, the frequency separation unit 60 of the present embodiment includes BPFs 61a and 61b and amplitude generation units 62a and 62b. A BPF refers to a bandpass filter. The BPFs 61a and 61b pass signals in a predetermined frequency band and block signals in other frequency bands. The bands of the BPFs 61a and 61b are set by input signals from the control unit 40, and the center frequencies of the passbands of the BPF 61a and 61b are $f_L$ and $f_H$, respectively. Of the received signals generated by the reception circuit 51, those that have passed through the BPFs 61a and 61b are input to the amplitude generation unit 62a and 62b.

The amplitude generation units 62a and 62b calculate the amplitude values of the input signals. As the amplitude value, for example, any of the following values can be used: The zero-to-peak measurement value of the input signal, the peak-to-peak measurement value of the input signal, the effective value of the input signal, the enveloped value of the input signal, or the average power value of the input signal.

In this way, two amplitudes corresponding to the two frequencies $f_L$ and $f_H$ are extracted from the received signal. Let the amplitudes corresponding to the frequencies $f_L$ and $f_H$ be $A_L$ and $A_H$, respectively.

Further, the signal judging unit 70 of the present embodiment judges the object detection based on the relationship between the amplitude $A_L$ and the amplitude $A_H$ extracted by the frequency separation unit 60. Specifically, for example, the signal judging unit 70 determines whether the detected object is within a predetermined detection range based on the comparison between the amplitude $A_L$ and the amplitude $A_H$. The "predetermined detection range" is a zone having a certain height and width centered at the directional axis of the transmitter/receiver 30. The "directional axis" is a straight line that substantially coincides with the locus of the points at which the maximum search wave intensity is obtained while changing the linear distance from the transmitter/receiver 30. Typically, the "directional axis" substantially coincides with the central axis of the transmitter/receiver 30. The "certain height and width" may change depending on the linear distance from the transmitter/receiver 30. The cross-sectional shape of the "predetermined detection range" in a virtual plane that is orthogonal to the directional axis is typically circular.

Figure 6:
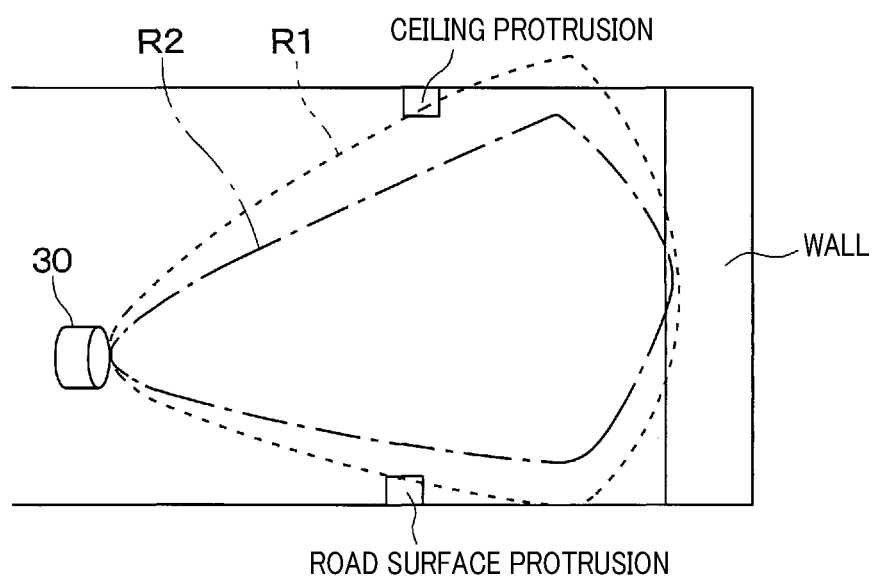
FIG. 6 is a diagram showing the range or reach of search waves.

As is clear from the above description, according to the configuration of the present embodiment, the manner in which the difference between the amplitude levels of the received signals of reflected waves occurs due to the difference between the frequencies of search waves changes depending on the vertical orientation angle of the object. For example, when the transmitter/receiver 30 has the characteristics shown in FIG. 2, the zone in which the search wave can reach an object sufficiently changes as shown in FIG. 6 due to the difference in directivity caused by the difference in frequency. In FIG. 6, the zone R1 represents the zone in which a search wave at a low frequency $f_L$ and with wide directivity can sufficiently reach an object. The zone R2 represents the zone in which a search wave at a high frequency $f_H$ and with narrow directivity can sufficiently reach an object. That is, search waves having wide directivity can sufficiently reach, in addition to a wall or the like in front of the transmitter/receiver 30, the road surface as well as the ceiling of the passage. On the other hand, search waves having narrow directivity can sufficiently reach a wall or the like in front of the transmitter/receiver 30, but not the road surface or the ceiling of the passage.

Figure 7:
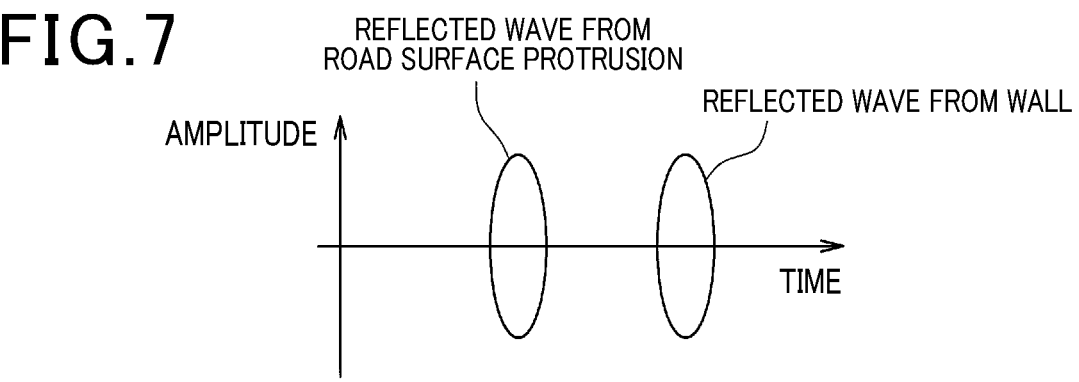
FIG. 7 is a diagram showing the amplitudes of reflected waves when a search wave with wide directivity has been transmitted.
Figure 8:
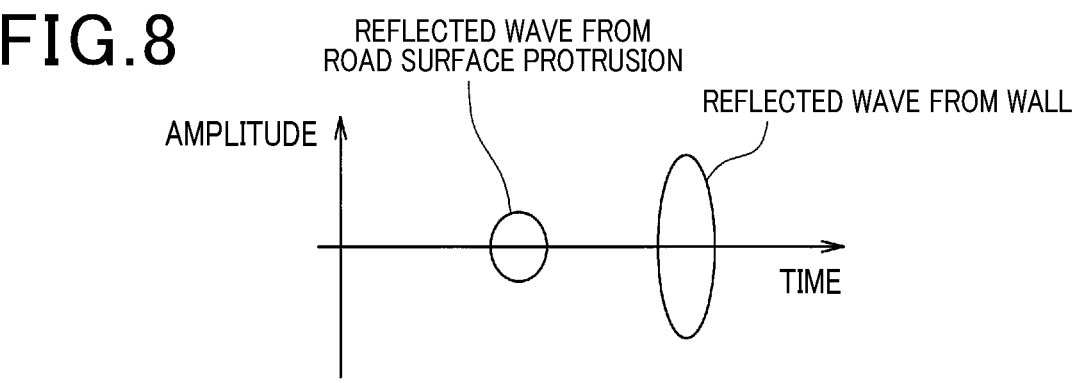
FIG. 8 is a diagram showing the amplitudes of reflected waves when a search wave with narrow directivity has been transmitted.

Therefore, when a search wave with wide directivity is transmitted, as shown in FIG. 7, there will not be much difference between the amplitude of the reflected wave from a wall in front of the transmitter/receiver 30 and the amplitude of the reflected wave from an object such as a protrusion on the road surface. On the other hand, when a search wave with narrow directivity is transmitted, as shown in FIG. 8, there will be a large difference between the amplitude of the reflected wave from a wall in front of the transmitter/receiver 30 and amplitude of the reflected wave from an object such as a protrusion on the road surface. Specifically, the amplitude of the reflected wave from a protrusion on the road surface is much smaller than that of the reflected wave from a wall in front of the transmitter/receiver 30.

The signal judging unit 70 of this embodiment uses this to determine whether the detected object is located within a predetermined detection range. Specifically, as shown in FIG. 1, the signal judging unit 70 includes an amplitude-ratio judging unit 71, and the signal determination unit 70 makes this determination based on the ratio of the amplitude $A_L$ and the amplitude $A_H$.

The amplitude-ratio determination unit 71 calculates, for example, $Ar=A_H/A_L$ as the amplitude ratio, and makes a determination as follows. That is, for example, as shown in FIG. 2, it is assumed that the transmitter/receiver 30 has such a characteristic that the directivity of a wave at the frequency $f_L$ is wider than the directivity of a wave at the frequency $f_H$. In this case, the amplitude-ratio judging unit 71 determines that the object is in the detection range when the amplitude ratio Ar is equal to or greater than a predetermined reference value. The amplitude-ratio judging unit 71 determines that the object is not in the detection range when the amplitude ratio Ar is smaller than the reference value.

Further, as shown in FIG. 3, now it is assumed that the transmitter/receiver 30 has such a characteristic that the directivity of a wave at the frequency $f_L$ is narrower than the directivity of a wave at the frequency $f_H$. In this case, the amplitude-ratio judging unit 71 determines that the object is in the detection range when the amplitude ratio Ar is equal to or smaller than reference value. The amplitude-ratio judging unit 71 determines that the object is not in the detection range when the amplitude ratio Ar is larger than the reference value.

The amplitude-ratio determination unit 71 may calculate Ar=$A_L/A_H$ as the amplitude ratio, and make a determination as follows. That is, when the transmitter/receiver 30 has the characteristic shown in FIG. 2, the amplitude-ratio judging unit 71 determines that the object is in the detection range when the amplitude ratio Ar is equal to or smaller than reference value. The amplitude-ratio judging unit 71 determines that the object is not in the detection range when the amplitude ratio Ar is larger than the reference value. In contrast, when the transmitter/receiver 30 has the characteristic shown in FIG. 3, the amplitude-ratio judging unit 71 determines that the object is in the detection range when the amplitude ratio Ar is equal to or larger than reference value. The amplitude-ratio judging unit 71 determines that the object is not in the detection range when the amplitude ratio Ar is smaller than the reference value.

Note that it is also possible to use AR=K×log($A_H/A_L$)=K×log($A_H$)−K×log($A_L$) as the amplitude ratio. The amplitude ratio AR may also be referred to as a logarithmic amplitude ratio AR. The constant K is typically 20. When the constant K is 20, the logarithmic amplitude ratio AR may also be referred to as a decibel difference. That is, "amplitude ratio" is not limited to the arithmetic division between two amplitudes, but is a concept including the decibel difference.

Figure 10:
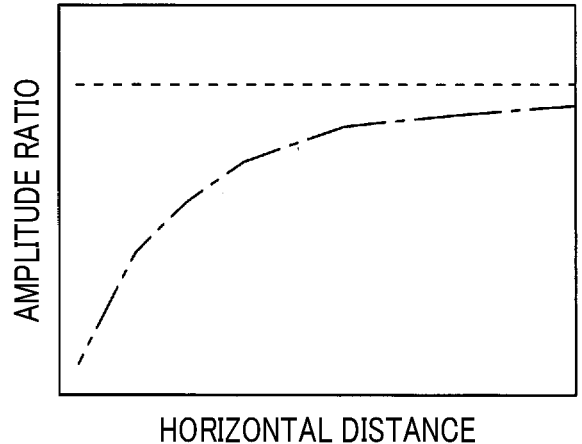
FIG. 10 is a diagram showing the relationship between the horizontal distance from the transmitter/receiver and the amplitude ratio.

FIG. 10 shows the relationship between the horizontal distance from the transmitter/receiver 30 and the amplitude ratio for both the wall and the protrusion on the road surface. In the graph, the broken line represents the theoretical value (that is, the calculated value) when the detected object is the wall, and the alternate long and short dash line represents the theoretical value when the detected object is the protrusion on the road surface.

Figure 9:
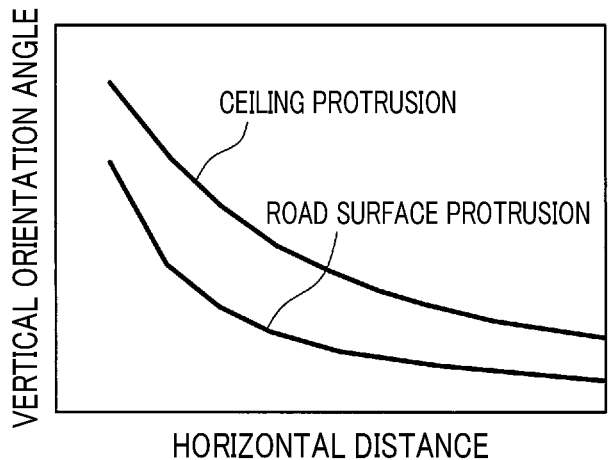
FIG. 9 is a diagram showing the relationship between the horizontal distance from the transmitter/receiver and the vertical orientation angle.

As shown in FIG. 9, the vertical orientation angles of a road surface protrusion and a ceiling protrusion increase as the horizontal distance from the transmitter/receiver 30 decreases. Therefore, as shown in FIG. 10, the amplitude ratio of a reflected wave from a wall in front of the transmitter/receiver 30 is substantially constant regardless of the horizontal distance from the transmitter/receiver 30. In contrast, the amplitude ratio of the reflected wave from the road surface or the like decreases as the horizontal distance from the transmitter/receiver 30 decreases.

Figure 11:
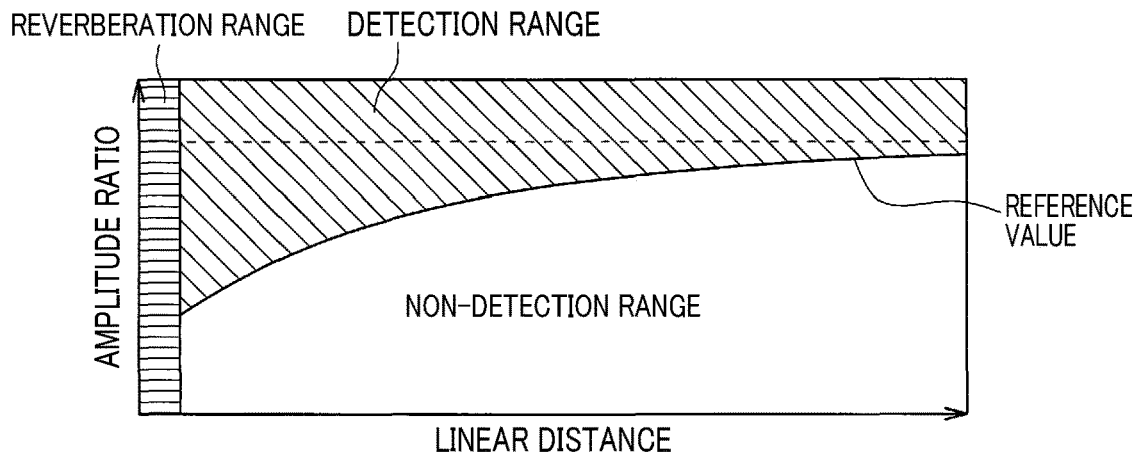
FIG. 11 is a diagram showing the reference value for determination and the detection range.

Considering this, for example, as shown in FIG. 11, the reference value with which the amplitude ratio Ar is compared is set so that it decreases as the linear distance from the transmitter/receiver 30 decreases. Note that the linear distance L from the transmitter/receiver 30 to the object is obtained by L=c×TOF/2, where c is the speed of sound. When the transmitter/receiver 30 has the characteristic shown in FIG. 2, it is determined that the object is in the detection range when the amplitude ratio Ar, that is, $A_H/A_L$ is equal to or larger than a predetermined reference value. On the other hand, it is determined that the object is not in the detection range when the amplitude ratio Ar is smaller than the reference value.

In FIG. 11, the broken line shows the amplitude ratio when $A_H$=$A_L$. The reverberation zone shown in FIG. 11 is a zone in which the reverberation of the transmitter/receiver 30 caused by transmitting search waves is detected. When the linear distance measured from the TOF is shorter than a predetermined value, the signal judging unit 70 determines that the received signal was generated by reverberation and does not perform the object detection determination.

Figure 12:
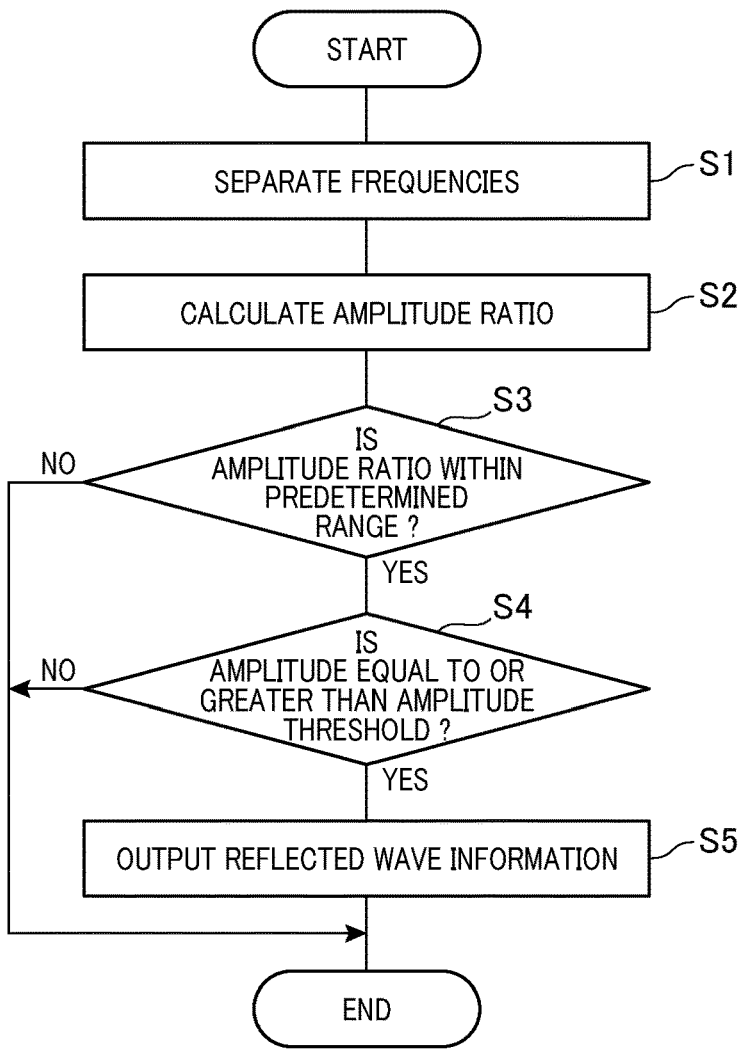
FIG. 12 is a flowchart of the reception process.

In the present embodiment, the reception process shown in FIG. 12 is carried out by such a configuration to distinguish objects that will become obstacles from other objects. This makes it possible to prevent unnecessary actions from being taken, for example, collision avoidance actions.

That is, when the amplitude of the received signal generated by the receiving unit 50 exceeds a predetermined amplitude threshold, the received signal is divided into frequency components corresponding to the two frequencies $f_L$ and $f_H$ by the frequency separation unit 60 in step S1. The respective amplitudes $A_L$ and $A_H$ of the frequency components corresponding to the two separated frequencies $f_L$ and $f_H$ are extracted.

Figure 13:
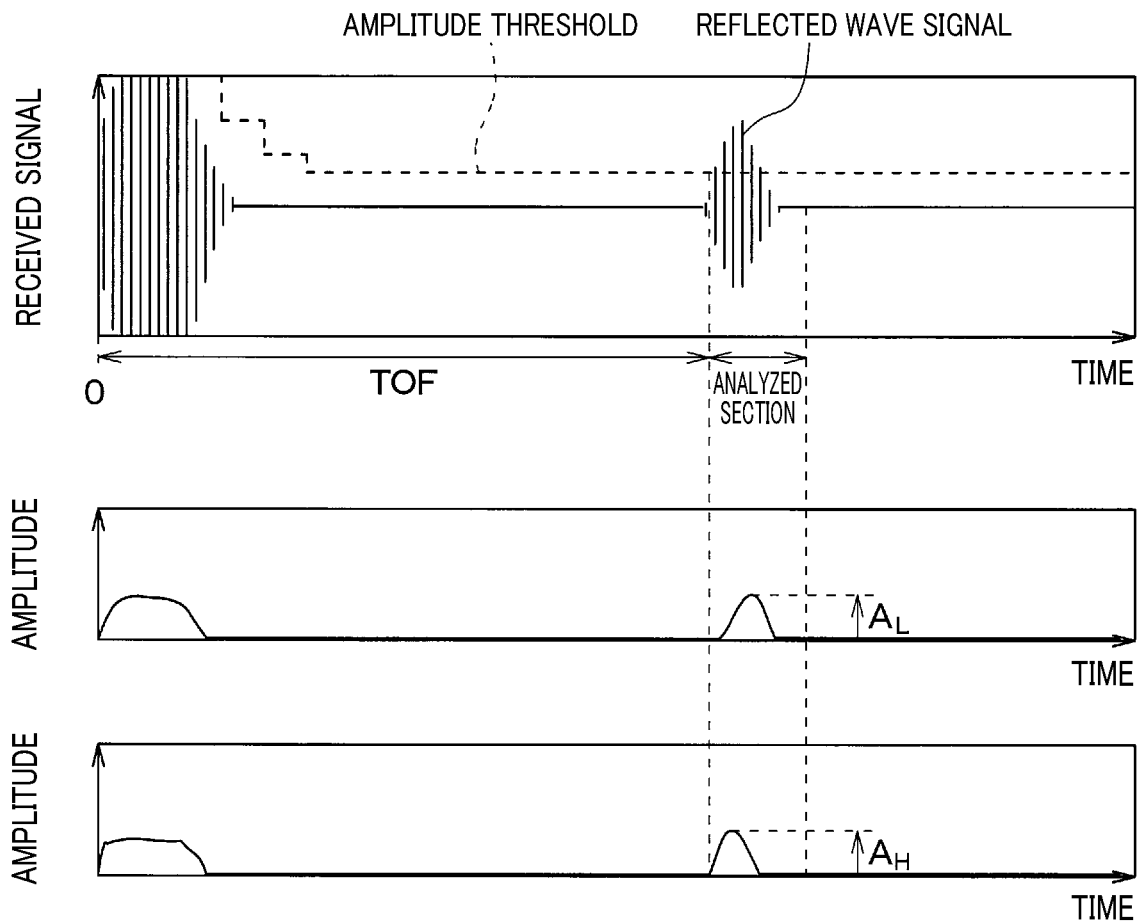
FIG. 13 is a diagram for explaining the analyzed section and the method of extracting amplitudes.

By selecting a certain time period as the analyzed period, the frequency separation unit 60 extracts the amplitudes $A_L$ and $A_H$ from the part of the received signal included in the analyzed period, and the signal judging unit 70 makes a determination. As shown in FIG. 13, for example, the analyzed period is set based on the time at which the amplitude of the received signal exceeds the amplitude threshold. The analyzed period may also be set based on the time at which the peak amplitude of the received signal is obtained or the time at which the received signal starts to rise. Further, the analyzed period may be a fixed duration from the reference time, or may be a fixed duration before and after the reference time. Selecting a certain time point such as the time at which the received signal starts to rise as the reference time of the analyzed period instead of the amplitude of the received signal, the accuracy of determination can be further improved.

As shown in FIG. 13, in the frequency separation unit 60, the amplitude generating unit 62a extracts the amplitude $A_L$ corresponding to the frequency $f_L$ from the part of the amplitude waveform of the received signal that has passed through the BPF 61a that is included in the analyzed period. Similarly, the amplitude generating unit 62b extracts the amplitude $A_H$ corresponding to the frequency $f_H$ from the part of the amplitude waveform of the received signal that has passed through the BPF 61b that is included in the analyzed period.

After step S1, in step S2, the amplitude ratio Ar is calculated by the amplitude ratio judging unit 71. Then, in step S3, as described above, the amplitude ratio Ar is compared with a reference value. When it is determined that the object is in the detection range from the comparison between the amplitude ratio Ar and the reference value, in step S4, the signal judging unit 70 compares the amplitudes $A_L$ and $A_H$ extracted in step S1 with an amplitude threshold. When the signal judging unit 70 determines that the amplitudes $A_L$ and $A_H$ are equal to or greater than the amplitude threshold, the signal judging unit 70 sends the reflected wave information to the control unit 40 in step S5, and ends the reception process. The transmitted reflected wave information may include, for example, the pattern of frequencies included in the reflected wave, TOF, and the peak value. Based on the transmitted reflected wave information, the control unit 40 takes one or more actions such as a collision avoidance action.

When it is determined in step S3 that the object is out of the detection range, or when it is determined in step S4 that the amplitudes $A_L$ and $A_H$ are smaller than the amplitude threshold, the reception process is terminated without carrying out step S5. That is, when it is determined that the object is out of the detection range based on the comparison result between the amplitude ratio Ar and the reference value, or the comparison result between the amplitude of the received signal and the amplitude threshold, the reception process ends without carrying out a collision avoidance action or the like.

As described above, the object detection device 1 of the present embodiment transmits search waves having two frequencies, extracts the amplitude for each frequency from the received signal, and makes an object detection determination based on the relationship between the extracted two amplitudes. Specifically, for example, the signal judging unit 70 compares at least two extracted amplitudes. This makes it possible to distinguish objects that are likely to come into contact with the vehicle body from other objects.

The amplitude of ultrasonic waves fluctuates as they are affected by atmospheric fluctuations caused by wind, uneven temperature distribution, and the like while propagating in the air. The amount of this amplitude variation acts similarly on ultrasonic waves that have propagated along the same propagation path at the same time. On the other hand, the time period from the start of transmission of two ultrasonic waves having different frequencies to the end of reception of the reflected waves from the same object is much shorter than the rate of change of atmospheric fluctuation. Therefore, it can be assumed that the two ultrasonic waves having different frequencies have been transmitted at substantially the same timing with respect to the rate of change of atmospheric fluctuation. The same applies to reception of the reflected waves. Therefore, the amount of amplitude variation in the reflected wave will be substantially the same for ultrasonic waves at two frequencies that have been transmitted at substantially the same timing and reflected from the same object. Thus, the influence of atmospheric fluctuations can be canceled by taking the amplitude ratio of the reflected waves of two frequencies.

Next, the above qualitative description will be verified using theoretical formulas. The sound pressure p [Pa] at a distance r [m] is represented by the following equation (1). In the equation (1), $E_0$ is the energy density [J/m$^3$] when there is no attenuation. c is the speed of sound [m/s] in the medium through which ultrasonic wave propagates. p is the density of the medium [kg/m$^3$]. D($\theta$) represents directional gain. $\theta$ represents the orientation angle. The orientation angle $\theta$ is the angle formed by the directional axis and a virtual straight line connecting the object and the transmitter/receiver 30. B represents the attenuation constant.

$$p^2 = E_0 \rho c^2 \frac{D(\theta)}{4\pi r^2} e^{(-2\beta r)} \qquad (1)$$

$E_0 = p_0^2/(\rho c^2)$, where $p_0$ is the sound pressure when the distance r=0. The attenuation constant $\beta$ changes with frequency.

The sound pressure of a reflected wave, which is an ultrasonic wave reflected by an object having a reflectance R at a distance r, is represented by the following equation (2). The equation (2) assumes that, for simplification of explanation, the directivity gain is the same for transmission and reception.

$$p^2 = E_0 \rho c^2 \frac{D(\theta)}{4\pi r^2} e^{(-2\beta r)} \cdot R \cdot \frac{D(\theta)}{4\pi r^2} e^{(-2\beta r)} = E_0 \rho c^2 \cdot R \cdot \left(\frac{D(\theta)}{4\pi r^2}\right)^2 e^{(-4\beta r)} \qquad (2)$$

In the case of frequency $f_L$, the equation (2) is transformed into the equation (3), and in the case of frequency $f_H$, the equation (2) is transformed into the equation (4).

$$p_L^2 = E_{0L} \rho c^2 \cdot R \cdot \left(\frac{D_L(\theta)}{4\pi r^2}\right)^2 e^{(-4\beta_L r)} \qquad (3)$$

$$p_H^2 = E_{0H} \rho c^2 \cdot R \cdot \left(\frac{D_H(\theta)}{4\pi r^2}\right)^2 e^{(-4\beta_H r)} \qquad (4)$$

In an actual environment in which the device is used, the values of p and c change with time because the temperature and air density change. However, as described above, it can be assumed that search waves of the two frequencies $f_L$ and $f_H$ generated by the same object detection device 1 are transmitted and received at substantially the same timing. Therefore, it can be considered that r, p, c, and R are the same in the above equations (3) and (4).

Therefore, dividing the right-hand side of the equation (3) by the right-hand side of the equation (4), r, p, c, and R disappear. That is, the following equation (5) can be obtained from the equations (3) and (4). Further, the following equation (6) can be obtained from the equation (5).

$$p_L^2/p_H^2 = \frac{E_{0L}}{E_{0H}} \left(\frac{D_L(\theta)}{D_H(\theta)}\right)^2 e^{4r(-\beta_L+\beta_H)} \qquad (5)$$

$$p_L/p_H = \sqrt{\frac{E_{0L}}{E_{0H}}} \frac{D_L(\theta)}{D_H(\theta)} e^{2r(-\beta_L+\beta_H)} \qquad (6)$$

When the microphone sensitivity, that is, the sensitivity of the transmitter/receiver 30 is represented by $M_r$ [V/Pa], the amplitude, that is, the reception voltage $V_r$ is represented by the product of the microphone sensitivity $M_r$ and the sound pressure p. That is, $V_r = M_r p$. Accordingly, the following equation (7) can be obtained.

$$V_{rL}/V_{rH} = M_{rL} p_L / M_{rH} p_H = \frac{M_{rL}}{M_{rH}} \sqrt{\frac{E_{0L}}{E_{0H}}} \frac{D_L(\theta)}{D_H(\theta)} e^{2r(-\beta_L+\beta_H)} \qquad (7)$$

$$= \frac{M_{rL}}{M_{rH}} \frac{p_{0L}}{p_{0H}} \frac{D_L(\theta)}{D_H(\theta)} e^{2r(-\beta_L+\beta_H)}$$

In the equation (7), $p_{0L}$ is the transmission sound pressure of the ultrasonic wave having the frequency $f_L$, and $p_{0H}$ is the transmission sound pressure of the ultrasonic wave having the frequency $f_H$. As described above, in the equation (7) representing the ratio of the reception voltages, there remain $p_{0L}/p_{0H}$, $M_rL/M_rH$, $D_L(\theta)/D_H(\theta)$, and $\exp\{2r(-\beta_L+\beta_H)\}$. $p_{0L}/p_{0H}$ will be referred to as a transmission sound pressure ratio. $M_{rL}/M_{rH}$ will be referred to as a microphone sensitivity ratio. $D_L(\theta)/D_H(\theta)$ will be referred to as a directional gain. $\exp\{2r(-\beta_L+\beta_H)\}$ will be referred to as a frequency attenuation ratio.

The transmission sound pressure ratio and the microphone sensitivity ratio are fixed once the structure and frequencies of the object detection device 1 are determined. Therefore, it is possible to cancel out the influence of the transmission sound pressure and the microphone sensitivity in the equation (7) by calculating the transmission sound pressure ratio and the microphone sensitivity ratio based on measurements obtained under standard conditions.

The frequency attenuation ratio represents the difference in the amount of attenuation due to a difference in frequency. The frequency attenuation ratio can be ignored if the frequency difference is small. That is, the frequency attenuation ratio is 1. On the other hand, when the frequency difference is not small enough to ignore the frequency attenuation ratio, a correction value can be calculated through actual measurement or theoretically. When the correction value is represented by k, the following equation (8) can be obtained from the equation (7).

$$\frac{D_L(\theta)}{D_H(\theta)} = k\frac{V_L}{V_H} \quad (8)$$

In this way, the accuracy of judging objects of a method in which two amplitudes corresponding to two frequencies are compared can be improved by reducing the influence of changes in the amplitude level due to atmospheric fluctuations and the like.

Figure 14:
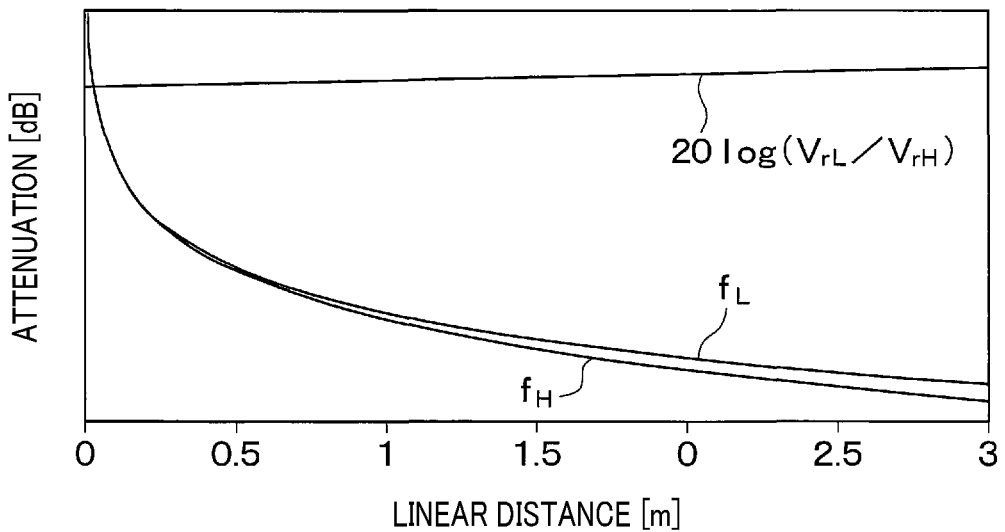
FIG. 14 is a diagram showing the relationship between the linear distance from the transmitter/receiver and the attenuation of amplitude level.

FIG. 14 shows the relationship between the linear distance from the transceiver 30 and the attenuation of the amplitude level. In the figure, "$f_L$" indicates the amplitude, i.e., the reception voltage $V_{rL}$ at the frequency $f_L$. "$f_H$" indicates the amplitude, i.e., the reception voltage $V_{rH}$ at the frequency $f_H$. As shown in FIG. 14, the greater the distance from the object, the greater the attenuation of the amplitude of the reflected wave, and further, the greater the frequency, the greater the attenuation. According to a method that uses the amplitude ratio as in the present embodiment, the influence of the amount of attenuation occurring due to the distance can be reduced, and thus the accuracy of judging objects can be improved.

The difference in the amount of attenuation generated in accordance with the distance generated by the difference in frequency can also be theoretically derived from the frequencies. The signal judging unit 70 may correct the reference value for comparison of the amplitudes using the theoretically obtained attenuation difference in accordance with the linear distance to the object calculated from the TOF. This makes it possible to improve the judging accuracy even when the frequency difference is large and thus the attenuation difference is large. The signal judging unit 70 may also improve the judging accuracy by comparing the two amplitudes after correcting them in accordance with the linear distance. Distance attenuation characteristics such as those shown in FIG. 14 can be obtained by actual measurement or using theoretical formulas, and the amount of correction of the reference value or amplitude can be set based on the obtained distance attenuation characteristics.

Figure 15:
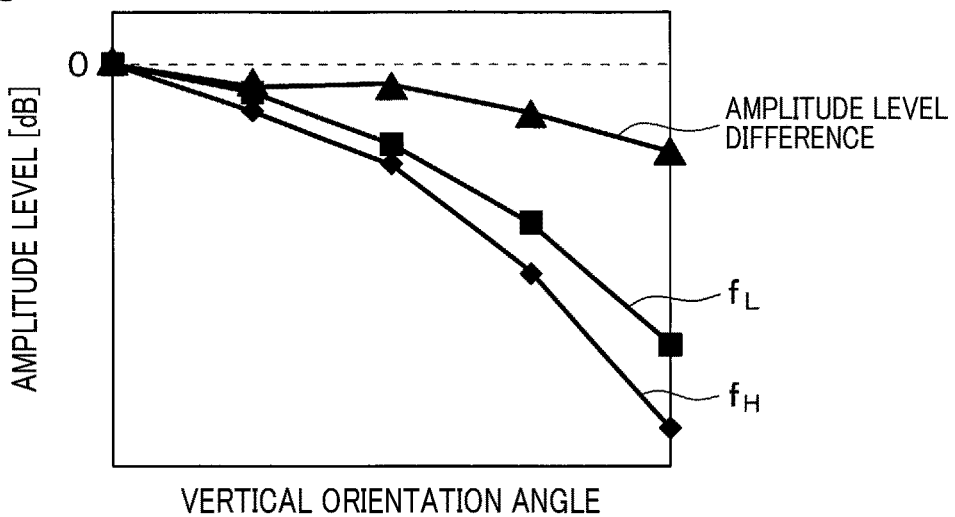
FIG. 15 is a diagram showing the difference in amplitude level difference when the frequency difference is small.
Figure 16:
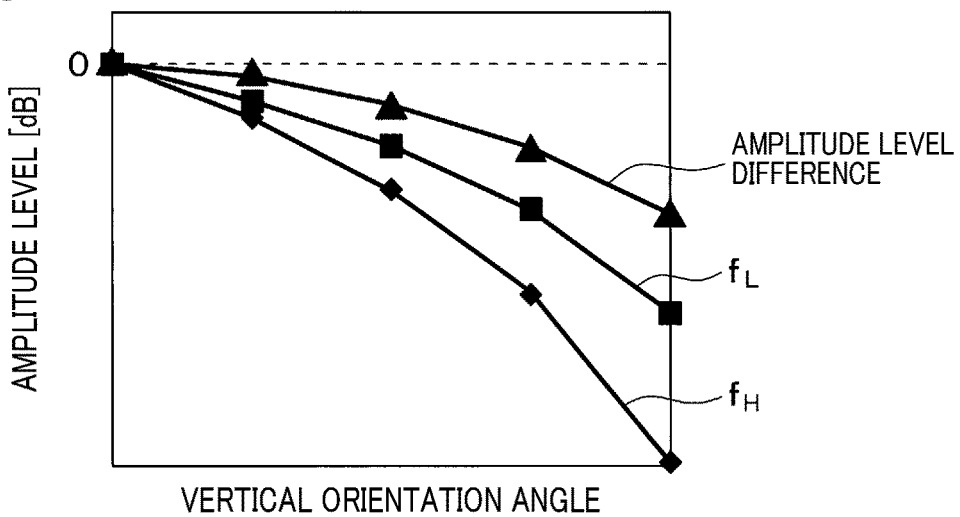
FIG. 16 is a diagram showing the difference in amplitude level when the frequency difference is large.

Note that, as shown in FIGS. 15 and 16, the larger the difference between the frequencies $f_L$ and $f_H$, the larger the difference in directivity. Accordingly, the difference between the amplitude levels of the reflected waves also increases, and the accuracy of determining whether an object is in the detection range is improved. However, when the frequencies $f_L$ and $f_H$ are not in the resonance band of the transmitter/receiver 30, the amplitudes and reception sensitivity of the search waves decrease, which causes the long-distance detection performance to deteriorate. Therefore, in order to improve the judging accuracy without degrading the detection performance, it is preferable to set one of the two frequencies higher than the resonance frequency and the other lower than the resonance frequency. More preferably, the upper and lower limits of the resonance band of the transmitter/receiver 30 are selected as $f_H$ and $f_L$, respectively.

For example, when the resonance frequency of the transmitter/receiver 30 is $f_0$ and the range of the center frequency $f_0 \pm 3\%$ is the resonance band, preferably, the center frequency+3% is $f_H$ and the center frequency−3% is $f_L$.

Further, when the search waves of the frequencies $f_H$ and $f_L$ are intermittently transmitted as in the present embodiment, if the interval between the two search waves is long, there tends to be a difference in the amount of variation due to atmospheric fluctuation and the like between the amplitudes $A_H$ and $A_L$. Therefore, the interval between the two search waves is preferably small.

Figure 17:
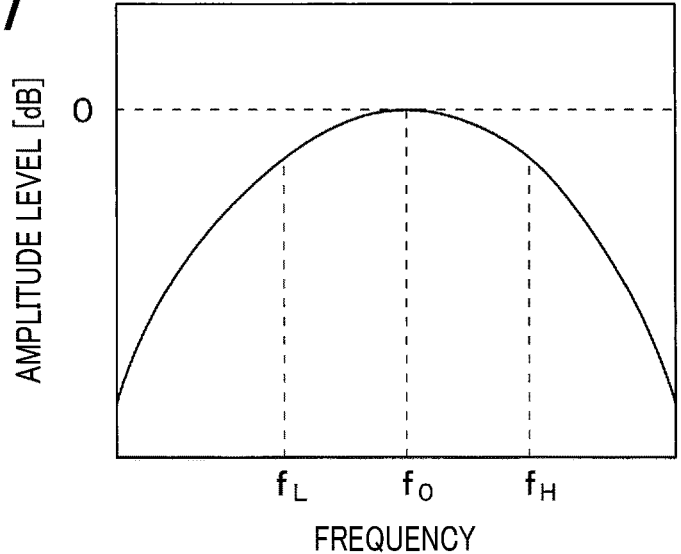
FIG. 17 is a diagram showing the frequency characteristics of a transmitter/receiver.

In addition, the one of the search waves at two frequencies that has the smaller amplitude is a bottleneck in determining the long-distance detection performance. Therefore, it is preferable to set the two frequencies so that the amplitudes of the reflected waves from an object in front of the transmitter/receiver 30 will be the same for the frequencies $f_L$ and $f_H$, as shown in FIG. 17.

For example, it is preferable to generate drive signals so that the amplitude levels of search waves corresponding to the frequencies $f_L$ and $f_H$ are the same in the zone in front of the transmitter/receiver 30, or the amplitude levels of the reflected waves from an object located in front of the transmitter/receiver 30 are the same. Note that, the phrase "the amplitude levels are the same" does not only mean that the amplitude levels are completely the same but also includes cases where the amplitude levels are substantially the same.

When the amplitude levels of the reflected waves from an object located in front of the transmitter/receiver 30 are different, for example, when the amplitude ratio, represented by AR=20 log($A_H/A_L$), is not 0, the amplitude ration obtained from the measurement results may be corrected based on this amplitude ratio AR. Alternatively, the reference value used to judge the amplitude ratio may be offset by an amount corresponding to the amplitude ratio AR.

Figure 18:
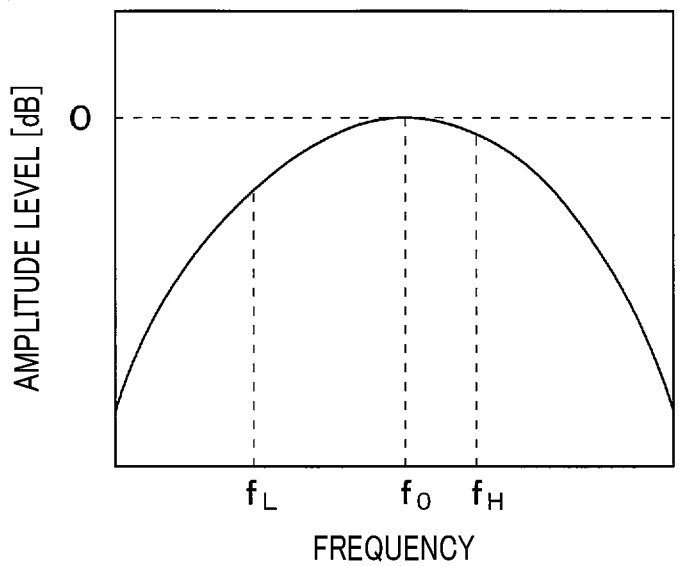
FIG. 18 is a diagram showing the frequency characteristics of a transmitter/receiver.

Further, since an ultrasonic wave having a high frequency $f_H$ has a larger distance attenuation than an ultrasonic wave having a low frequency $f_L$, in the case of long-distance detection, the frequencies $f_L$ and $f_H$ may be chosen so that the amplitude of a search wave at the frequency $f_H$ will be larger than the amplitude of a search wave at the frequency $f_L$, as shown in FIG. 18.

When the performance of judging the height of the object is prioritized, it is preferable chose the frequencies $f_L$ and $f_H$ so that the difference in directivity is maximized. However, since the long-distance detection performance deteriorates when the frequencies $f_L$ and $f_H$ are not in the resonance band of the transmitter/receiver 30, in this case as well, the frequencies $f_L$ and $f_H$ are preferably chosen so that they are in the resonance band of the transmitter/receiver 30.

The object detection device 1 of the present embodiment uses drive signals having at least two frequencies, which have different directivity due to their difference in frequency. The object detection device 1 of the present embodiment extracts at least two amplitudes corresponding to at least two frequencies, and performs object detection determination based on the relationship between the extracted at least two amplitudes. This makes it possible to distinguish between obstacle objects and other objects with good accuracy. In addition, the influence of changes in the amplitude level due to atmospheric fluctuation and the like can be reduced by performing the object detection determination based on the amplitudes of the received signals corresponding to two or more frequencies. Therefore, according to such a configuration, it is possible to perform object detection determination more accurately than in the conventional techniques.

SECOND EMBODIMENT

The second embodiment will be described. In the present embodiment, the method of judging the object is changed with respect to the first embodiment, and the other features are the same as those in the first embodiment. Thus, only the differences from the first embodiment will be described.

Figure 19:
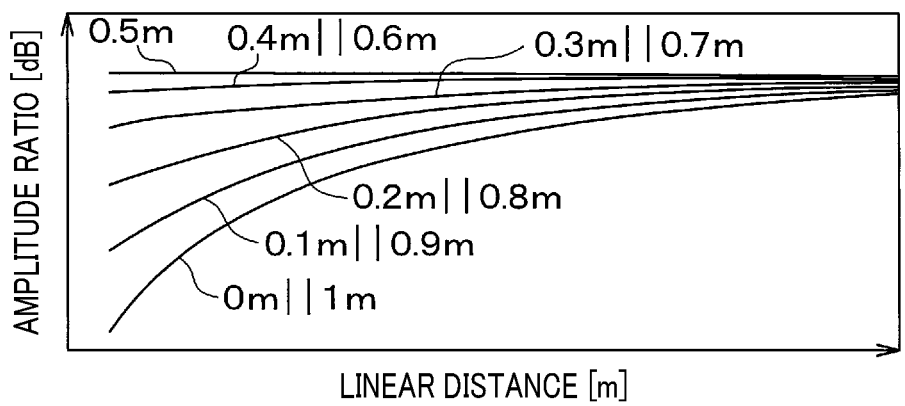
FIG. 19 is a diagram showing the relationship between the linear distance from the transmitter/receiver to the object and the amplitude ratio.

The signal judging unit 70 of the present embodiment sets the detection range based on the height at which the transmitter/receiver 30 is placed, and judges an object as follows. That is, the signal judging unit 70 is provided with a map showing the relationship between the amplitude ratio and the linear distance from the transmitter/receiver 30 to the object, like the one shown in FIG. 19. Note that, in FIG. 19, the transmitter/receiver 30 is provided at a height of 0.5 m, and for a reflected wave from an object at a height of 0.5 m, r=1, that is, R=0.

The relationship between the amplitude ratio and the linear distance can be obtained by, for example, actual measurement. Based on the amplitude ratio calculated by the amplitude ratio judging unit 71 and the linear distance L calculated from the TOF, the signal judging unit 70 determines the height $h_O$ of the object from the map shown in FIG. 19.

Figure 20:
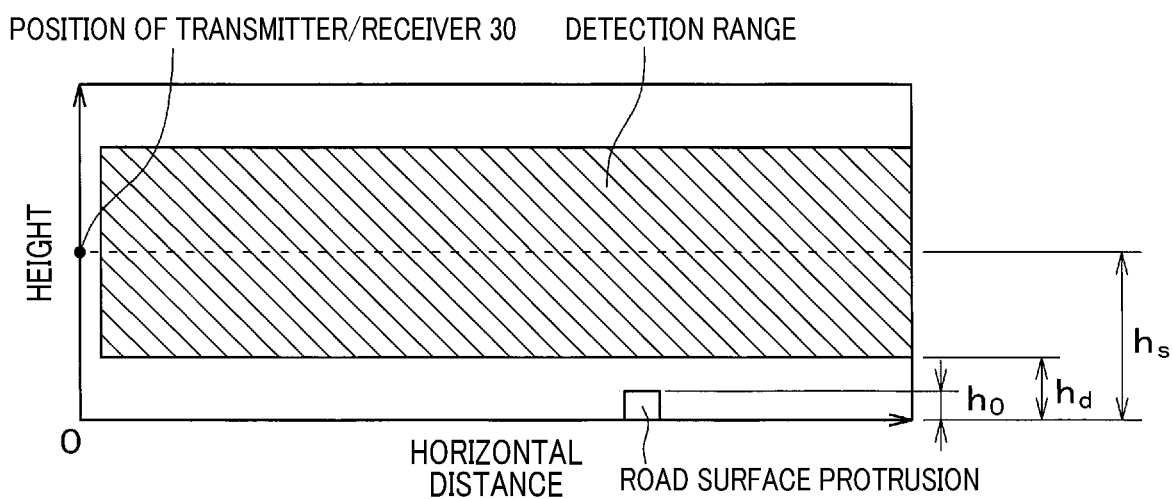
FIG. 20 shows the detection range according to a second embodiment.

As shown in FIG. 20, the detection range is set based on the height $h_s$ at which the transmitter/receiver 30 is located. The signal judging unit 70 compares the height $h_O$ with the height $h_d$, which is the lower limit of the detection range, and when $h_O \geq h_d$, it is determined that the object is in the detection range, and when $h_O < h_d$, it is determined that the object is out of the detection range.

The effects of the first embodiment are similarly exhibited by the present embodiment that judges objects in such a manner.

THIRD EMBODIMENT

The third embodiment will be described. In the present embodiment, a temperature measuring unit is added to the first embodiment, and the other features are the same as those in the first embodiment. Thus, only the differences from the first embodiment will be described.

Figure 21:
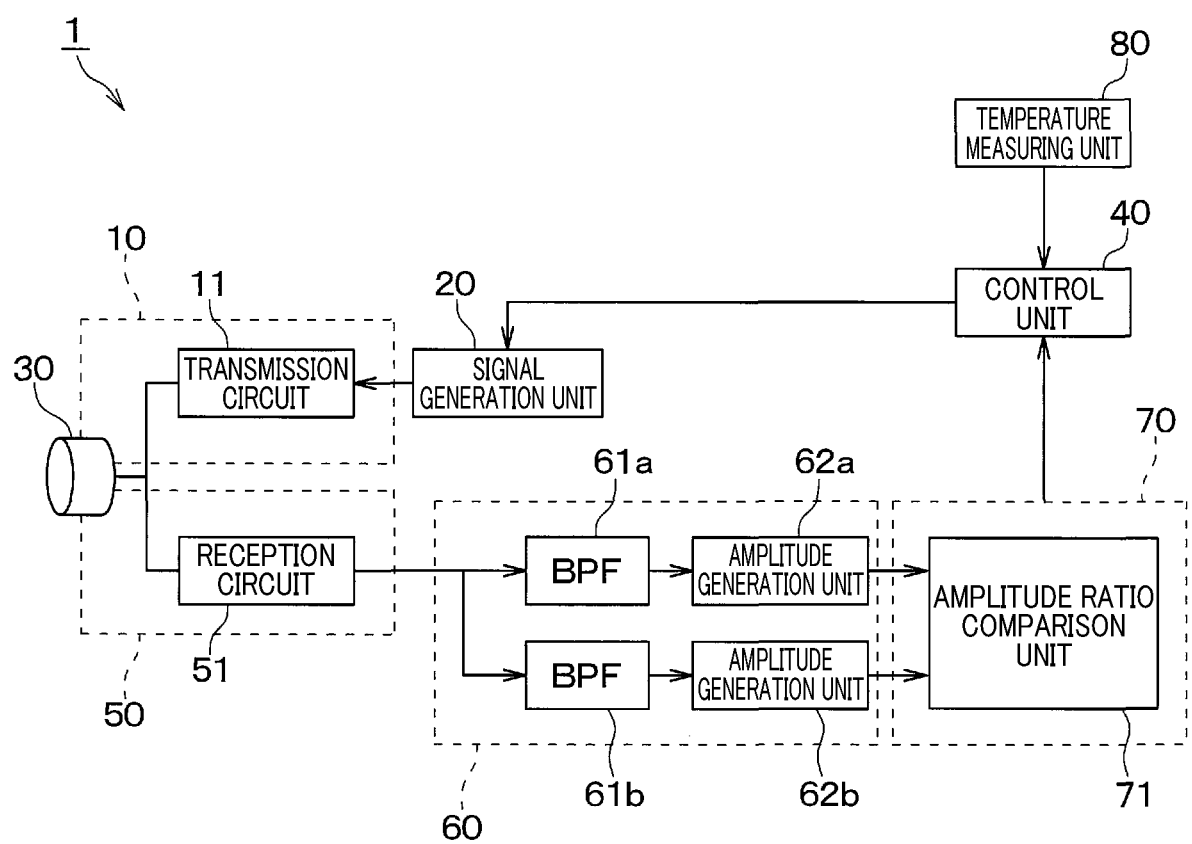
FIG. 21 shows the configuration of an object detection device according to a third embodiment.

As shown in FIG. 21, the object detection device 1 of this embodiment includes a temperature measuring unit 80. The temperature measuring unit 80 is placed so as to measure the environmental temperature, and the environmental temperature measured by the temperature measuring unit 80 is transmitted to the signal judging unit 70 via the control unit 40. Then, the signal judging unit 70 corrects the reference value with which the amplitudes $A_L$ and $A_H$ are compared in accordance with the ambient temperature. Alternatively, the signal judging unit 70 performs the comparison after correcting the amplitudes $A_L$ and $A_H$ in accordance with the ambient temperature.

Figure 22:
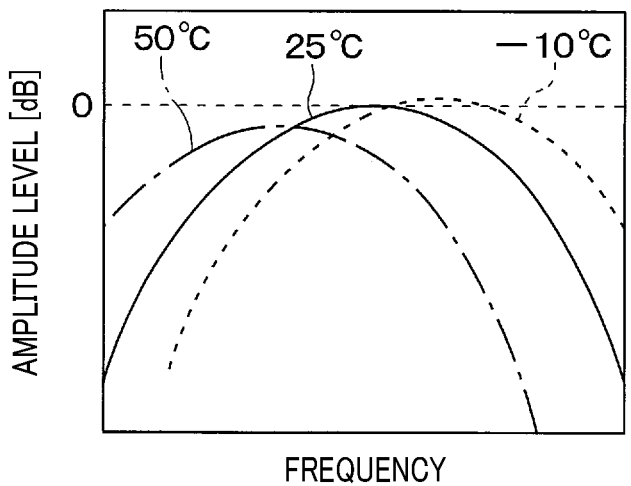
FIG. 22 is a diagram showing the temperature characteristics of a transmitter/receiver.
Figure 23:
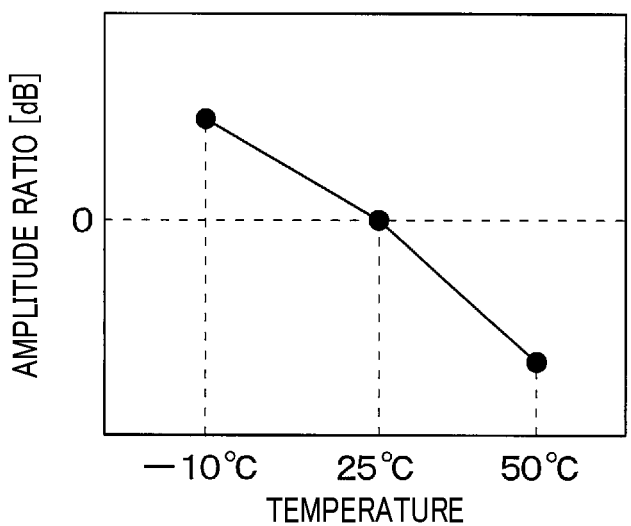
FIG. 23 is a diagram showing the relationship between the temperature and the amplitude ratio.

The resonance frequency and resonance band of the transmitter/receiver 30 change depending on the temperature. For example, as shown in FIG. 22, the lower the temperature, the higher the resonance frequency, and the higher the temperature, the lower the resonance frequency. Since the amplitude ratio changes in accordance with such changes in the characteristics as shown in FIG. 23, the accuracy of judging objects may deteriorate.

By correcting, for example, the reference value in accordance with the environmental temperature, the influence of the temperature change can be reduced and the accuracy of judging objects can be improved.

Figure 24:
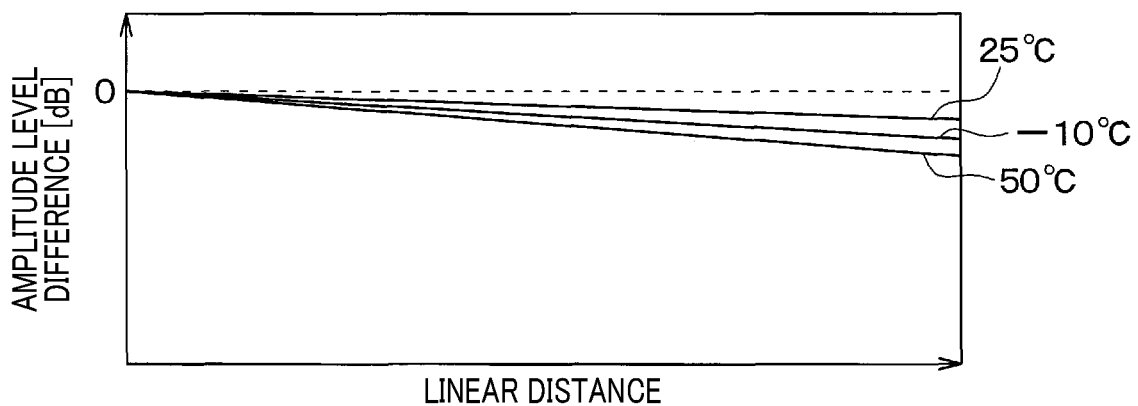
FIG. 24 is a diagram showing change in distance attenuation with temperature.

Note that, although the amplitude of a reflected wave attenuates due to the distance as described in connection to the first embodiment, this distance attenuation changes not only with the frequency of the search wave but also with the temperature as shown in FIG. 24. The amount of variation in distance attenuation due to a temperature change differs depending on the frequency. In a configuration provided with the temperature measuring unit 80 as in the present embodiment, the determination accuracy can be improved by correcting the distance attenuation difference between reflected waves due to a difference in frequency based on the environmental temperature.

FOURTH EMBODIMENT

The fourth embodiment will be described. In the present embodiment, the configuration of the frequency separation unit 60 is changed with respect to the first embodiment, and the other features are the same as those in the first embodiment. Thus, only the differences from the first embodiment will be described.

Figure 25:
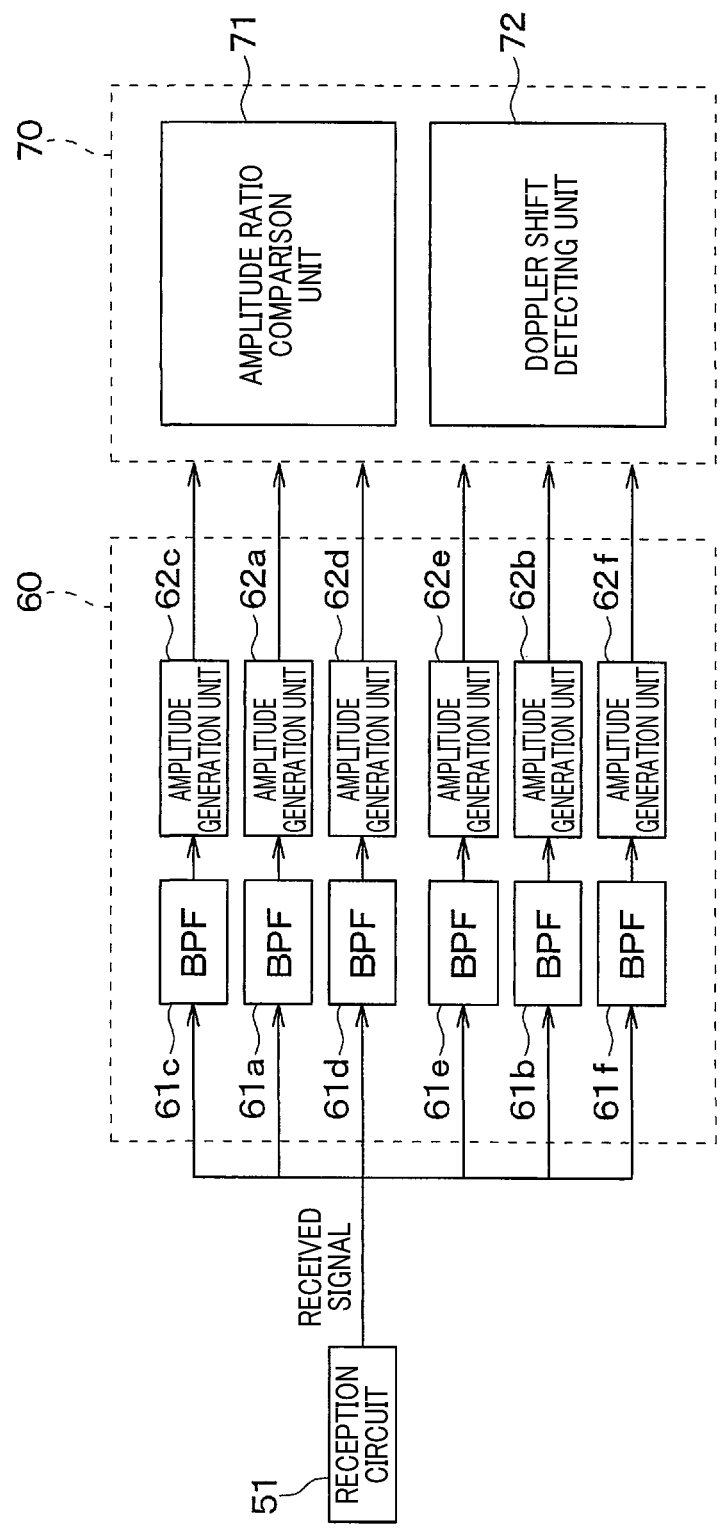
FIG. 25 is a diagram showing the configuration of a frequency separation unit and a signal judging unit according to a fourth embodiment.

As shown in FIG. 25, the frequency separation unit 60 of the present embodiment includes, in addition to the BPFs 61a and 61b, four BPFs. Let the four BPFs be BPF 61c, 61d, 61e, and 61f.

In the present embodiment, the signal judging unit 70 includes a Doppler shift detection unit 72, and the Doppler shift detection unit 72 estimates the range of the Doppler shift amount of the reflected wave with respect to the search wave based on information such as the positional history of the detected object, the frequency analysis result of the received signal, and the vehicle speed. The bands of the BPF 61c to 61f are set in consideration of the estimated range of the Doppler shift amount.

Specifically, when the range of the Doppler shift amount is represented by $\pm f_{SHIFT}$, the center frequency of the band of the BPF 61c is lower than that of the BPF 61a by $f_{SHIFT}$, and the center frequency of the band of the BPF 61d is higher than that of the BPF 61a by $f_{SHIFT}$. Further, the center frequency of the band of the BPF 61e is lower than that of the BPF 61b by $f_{SHIFT}$, and the center frequency of the band of the BPF 61f is higher than that of the BPF 61b by $f_{SHIFT}$.

Similarly to the amplitude generation units 62a and 62b, amplitude generation units 62c, 62d, 62e, and 62f are provided for the BPFs 61c to 61f, and the amplitude generation units 62c to 62f extract amplitudes from the received signals that have passed through the BPFs 61c to 61f. The amplitude ratio judging unit 71 selects two of the amplitudes extracted by the amplitude generation units 62a to 62f based on the current estimation of the Doppler shift amount, and calculates the amplitude ratio.

With such a configuration, it is possible to suppress a decrease in determination accuracy due to the influence of the Doppler shift of the reflected wave with respect to the search wave.

Note that, although extra BPFs are added to the frequency separation unit 60 in the present embodiment, the Doppler shift may be tackled by other means.

For example, a received signal may not only be input to the frequency separation unit 60 but also stored in a buffer (not shown), and when a Doppler shift is detected from the output signals of the frequency separation unit 60, the center frequencies of the bands of the BPFs 61a and 61b are shifted by the Doppler shift amount $f_{SHIFT}$. Then, the received signal in the buffer is processed by the frequency separation unit 60.

It is also possible to estimate the Doppler shift amount $f_{SHIFT}$ from information such as the vehicle speed before transmitting the search wave, and change the center frequencies of the bands of the BPFs 61*a* and 61*b* by the estimated Doppler shift amount $f_{SHIFT}$ beforehand.

FIFTH EMBODIMENT

The fifth embodiment will be described. In the present embodiment, the configuration of the frequency separation unit 60 is changed with respect to the first embodiment, and the other features are the same as those in the first embodiment. Thus, only the differences from the first embodiment will be described.

Figure 26:
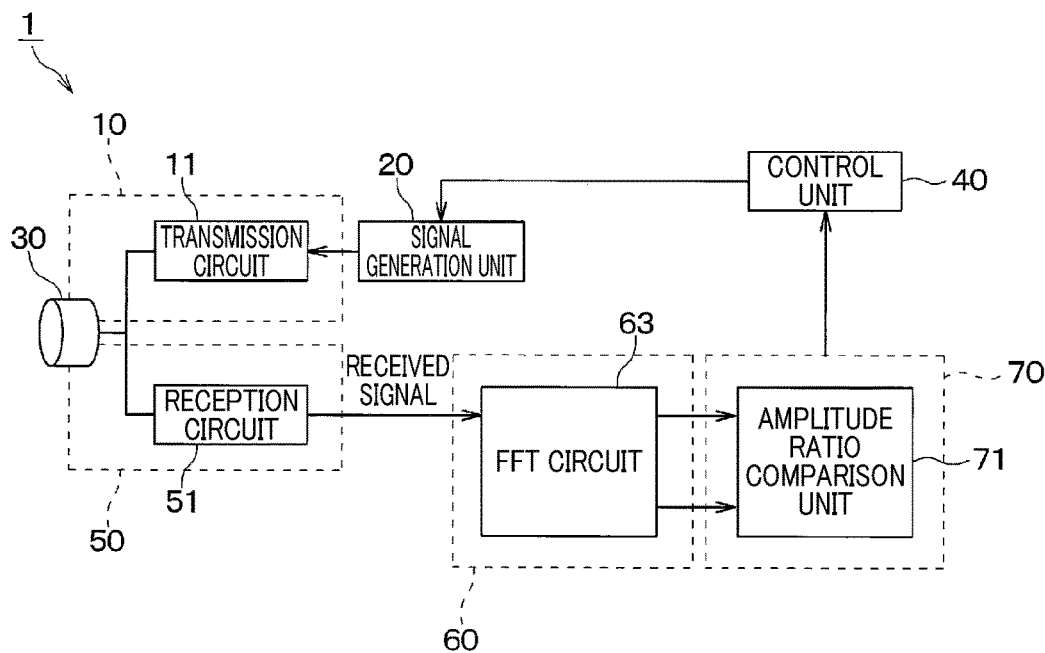
FIG. 26 shows the configuration of an object detection device according to a fifth embodiment.

As shown in FIG. 26, the frequency separation unit 60 of the present embodiment includes an FFT circuit 63. FFT is an abbreviation for fast Fourier transform. The FFT circuit 63 performs FFT analysis on the received signal generated by the reception circuit 51, and extracts the amplitudes $A_L$ and $A_H$ of the components corresponding to the frequencies $f_L$ and $f_H$ from the received signal. As the time window for the FFT analysis, an analysis period set as in the first embodiment is used. The FFT circuit 63 outputs the amplitudes $A_L$ and $A_H$ extracted by the FFT analysis to the signal judging unit 70.

The effects of the first embodiment are similarly exhibited by the present embodiment that extracts the amplitudes $A_L$ and $A_H$ by FFT analysis.

Figure 27:
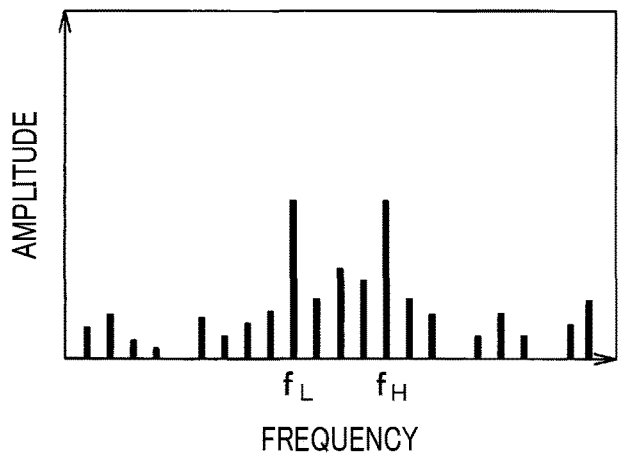
FIG. 27 is a diagram showing the result of FFT analysis.
Figure 28:
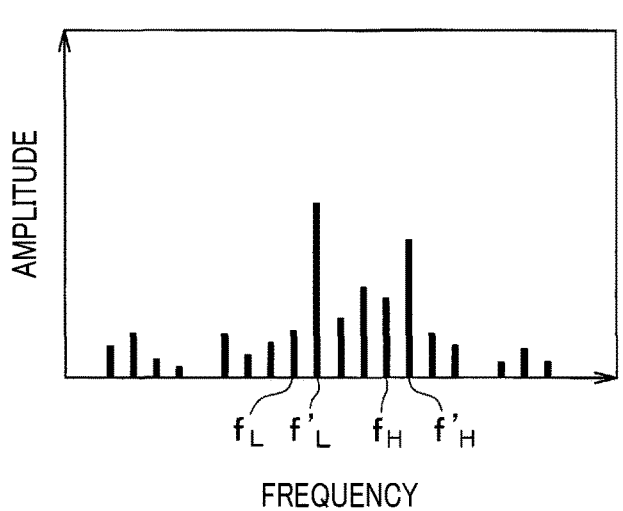
FIG. 28 is a diagram showing the result of FFT analysis when a Doppler shift is present.

Note that, in the present embodiment, when there is no Doppler shift, the amplitude for each frequency is extracted by FFT analysis as shown in FIG. 27. When, for example, the vehicle approaches the object and the frequency of the reflected wave increases, as shown in FIG. 28, the amplitude of the reflected wave corresponding to the frequency $f_L$ increases because its frequency approaches the center of the band of the transmitter/receiver 30. On the other hand, the amplitude of the reflected wave corresponding to the frequency $f_H$ decreases because its frequency moves away from the center of the band of the transmitter/receiver 30. In FIG. 28, $f_L'$ and $f_H'$ are frequencies $f_L$ and $f_H$ with the Doppler shift added.

It is possible to suppress a decrease in the judging accuracy due to the influence of the Doppler shift by detecting the amount of the Doppler shift based on such changes in the amplitudes and the frequency characteristics of the transmitter/receiver 30, and correcting the reference value with which the amplitude ratio or the amplitude is compared based on the Doppler shift amount.

In some cases, generation of a Doppler shift may be predicted before starting the measurement based on the vehicle speed, the number of times a Doppler shift has been detected in the history of measurement results for a predetermined number of previous measurement cycles, and the like. In such cases, the attenuation of the amplitude of the reflected wave may be suppressed by correcting the frequency of the drive signal according to the Doppler shift amount. As a result, it is possible to prevent the judging accuracy from decreasing and also prevent the long-distance performance from deteriorating.

Note that, when the time window of FFT analysis is represented by Tw, the frequency step size $f_{step}$ is $f_{step}=1/Tw$. In case of correcting the frequency in accordance with the Doppler shift, it is preferable to set Tw so that $f_{step}$ is sufficiently small with respect to the frequency accuracy to be corrected.

SIXTH EMBODIMENT

The sixth embodiment will be described. This embodiment is different from the first embodiment in that a configuration for distinguishing the reflected waves is added, and the other parts are similar to those of the first embodiment. Therefore, only the differences from the first embodiment will be described.

Figure 29:
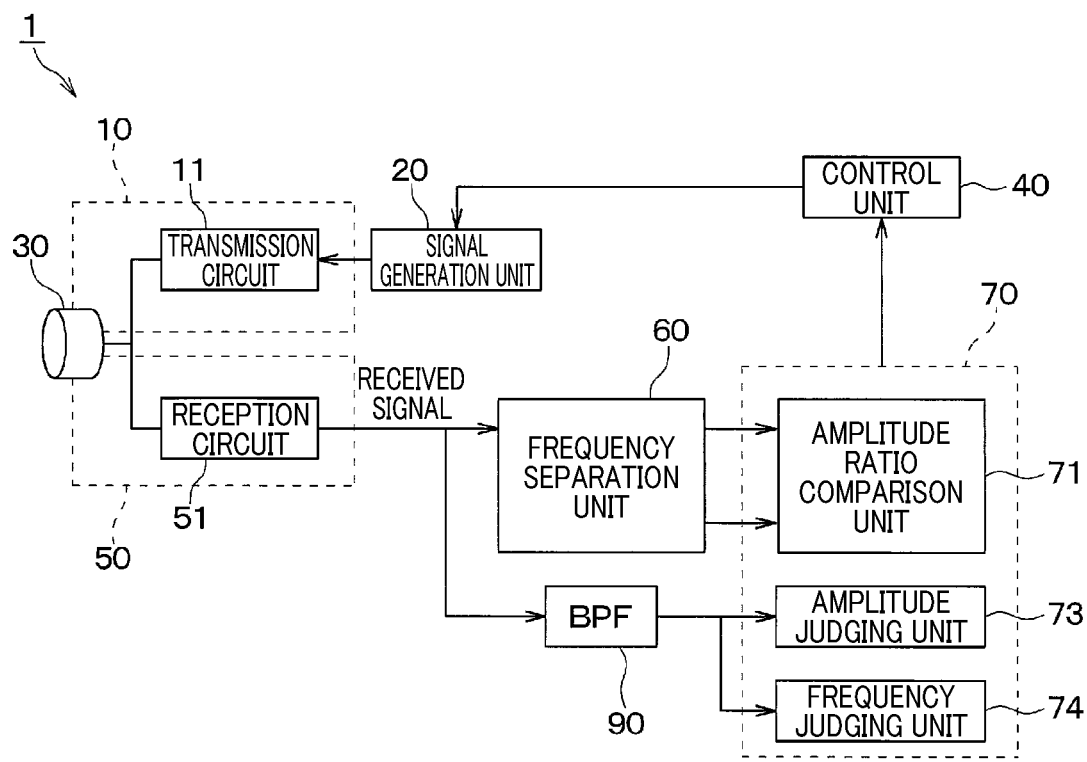
FIG. 29 shows the configuration of an object detection device according to a sixth embodiment.

As shown in FIG. 29, the object detection device 1 of the present embodiment includes a BPF 90, and a received signal generated by the reception circuit 51 is input to the frequency separation unit 60 and the BPF 90.

The signal judging unit 70 includes an amplitude judging unit 73 and a frequency judging unit 74 in addition to the amplitude ratio judging unit 71. The received signal that has passed through the BPF 90 is input to the amplitude judging unit 73 and the frequency judging unit 74. The amplitude judging unit 73 and the frequency judging unit 74 are configured to distinguish the reflected waves of search waves transmitted by the transmitter/receiver 30 from ultrasonic waves transmitted from other vehicles or the like by comparing the drive signals and the received signals.

The amplitude judging unit 73 determines whether the amplitude of the received signal is equal to or greater than a predetermined threshold. When the amplitude judging unit 73 determines that the amplitude of the received signal is equal to or greater than the threshold, the frequency judging unit 74 identifies the received wave based on the frequency of the received signal.

Specifically, the frequency judging unit 74 mixes the drive signal and the received signal, extracts phase difference information from the received signal, calculates the frequency of the received wave based on the frequency of the drive signal and the extracted phase difference information, and generates a frequency waveform. Then, the frequency judging unit 74 calculates the residual sum of squares of the generated frequency waveform and the frequency waveform of the drive signal. When the calculated residual sum of squares is smaller than a predetermined threshold, it is determined that the received wave is a reflected wave of a search wave transmitted from the transmitter/receiver 30. On the other hand, when the calculated residual sum of squares is equal to or greater than the threshold, the frequency judging unit 74 determines that the received wave is not a reflected wave of a search wave transmitted from the transmitter/receiver 30.

The signal judging unit 70 performs object detection determination when the frequency judging unit 74 determines that the received wave is a reflected wave of a search wave. Performing the detection determination after identifying the received wave in this way further improves the accuracy of object determination.

Figure 30:
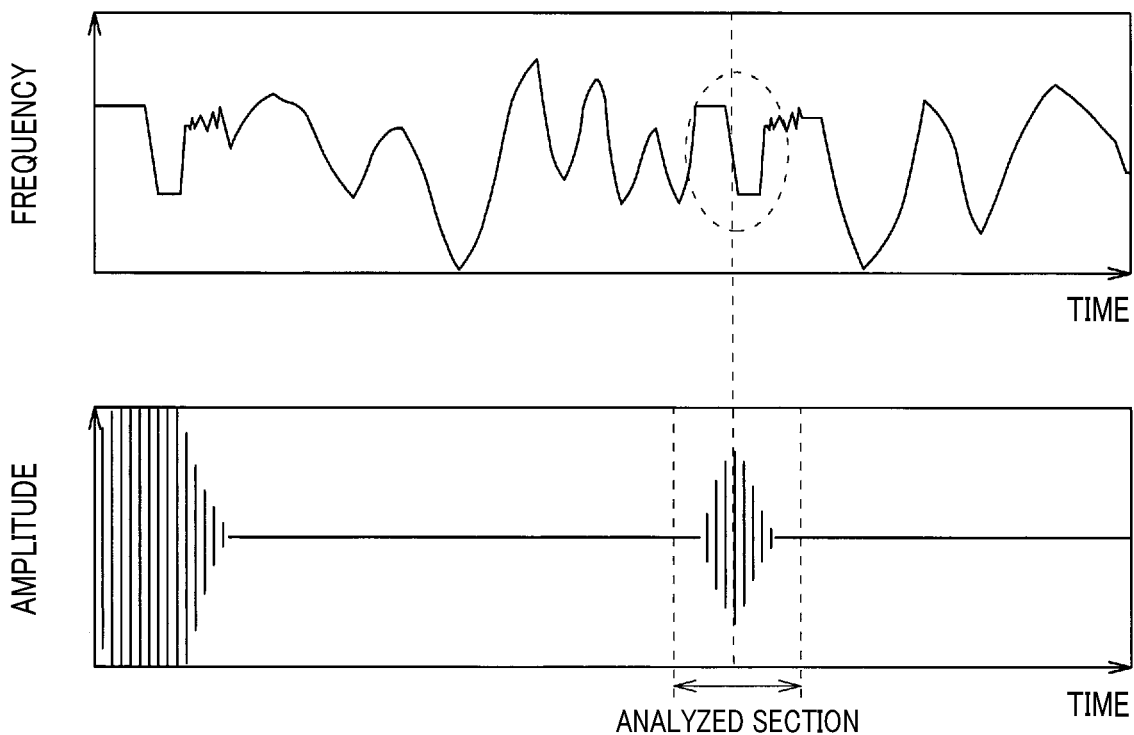
FIG. 30 is a diagram for explaining how the analyzed section is set according to the sixth embodiment.

In the case where the frequencies of the drive signal and the received signal are compared, as shown in FIG. 30, the analyzed period may be set based on the time at which the same frequency pattern as the drive signal is detected from the received signal. Note that, in FIG. 30, the same pattern as the drive signal is detected in the part surrounded by a broken line, and the analyzed period is set as a certain duration centered at the time at which this pattern has been detected. By setting the analyzed period in this way, the accuracy of object determination increases.

OTHER EMBODIMENTS

Note that the present disclosure is not limited to the above-described embodiments, and it can be modified as appropriate. In addition, the above embodiments are not irrelevant to each other, and they can be appropriately combined unless the combination is clearly impossible. It is needless to say that the elements constituting the embodiments are not necessarily essential unless explicitly stated as essential or obviously considered essential in principle. In addition, when a numerical value such as the number, value, amount, or range of a component(s) of any of the above-described embodiments is mentioned, it is not limited to the particular number or value unless expressly stated otherwise or it is obviously limited to the particular number or value in principle, etc. When the shape, positional relationship, or the like of a component(s) or the like of any of the embodiments is mentioned, it is not limited to the shape, positional relationship, or the like unless explicitly stated otherwise or it is limited to the specific shape, positional relationship, or the like in principle, etc.

Figure 31:
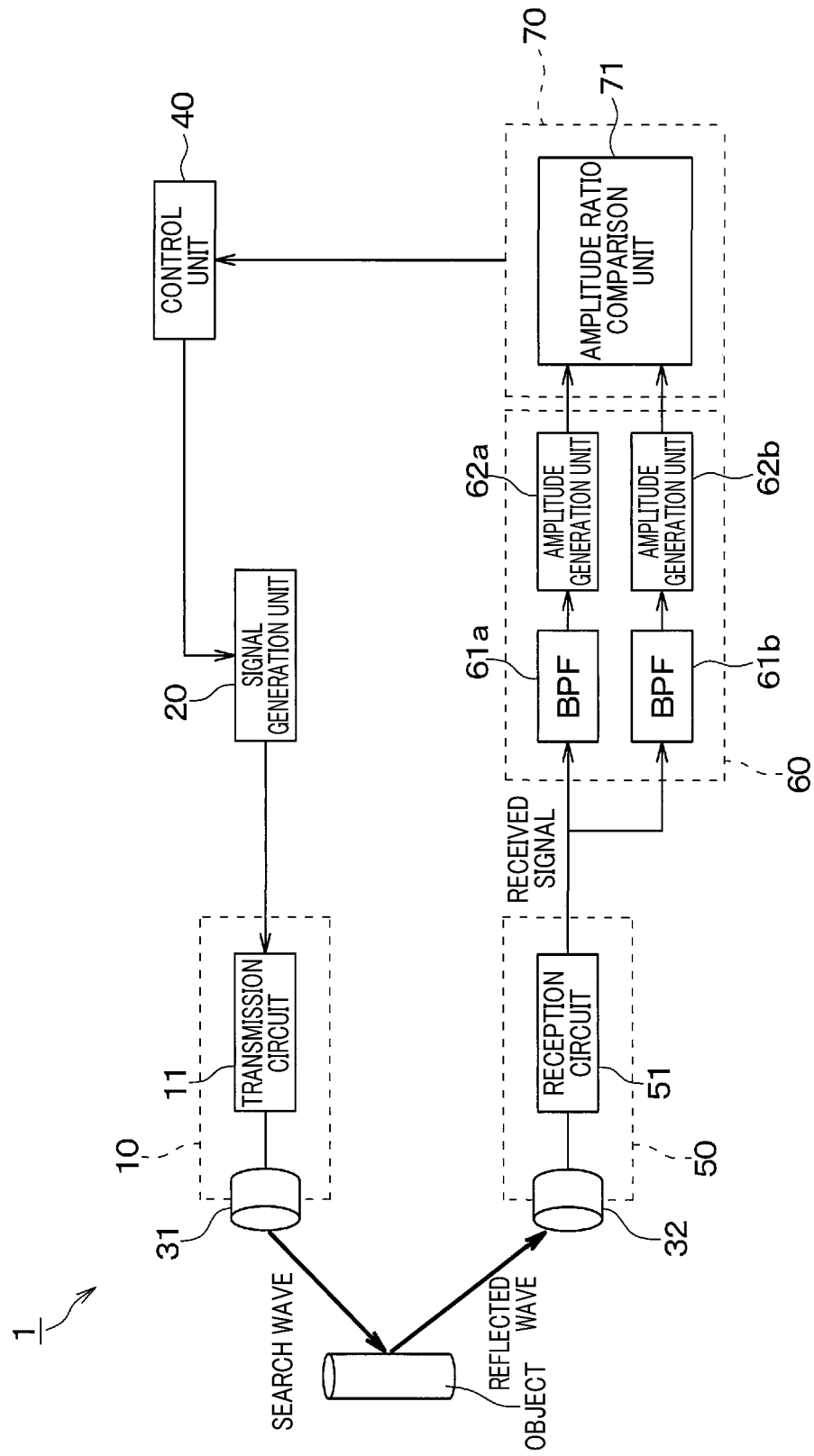
FIG. 31 shows the configuration of an object detection device according to another embodiment.

For example, as shown in FIG. 31, the object detection device 1 may include a transmitter 31 and a receiver 32, and the transmitter 31 and the transmitting circuit 11 may form the transmitting unit 10, and the receiver 32 and the receiving circuit 51 may form the receiving unit 50.

Figure 34:
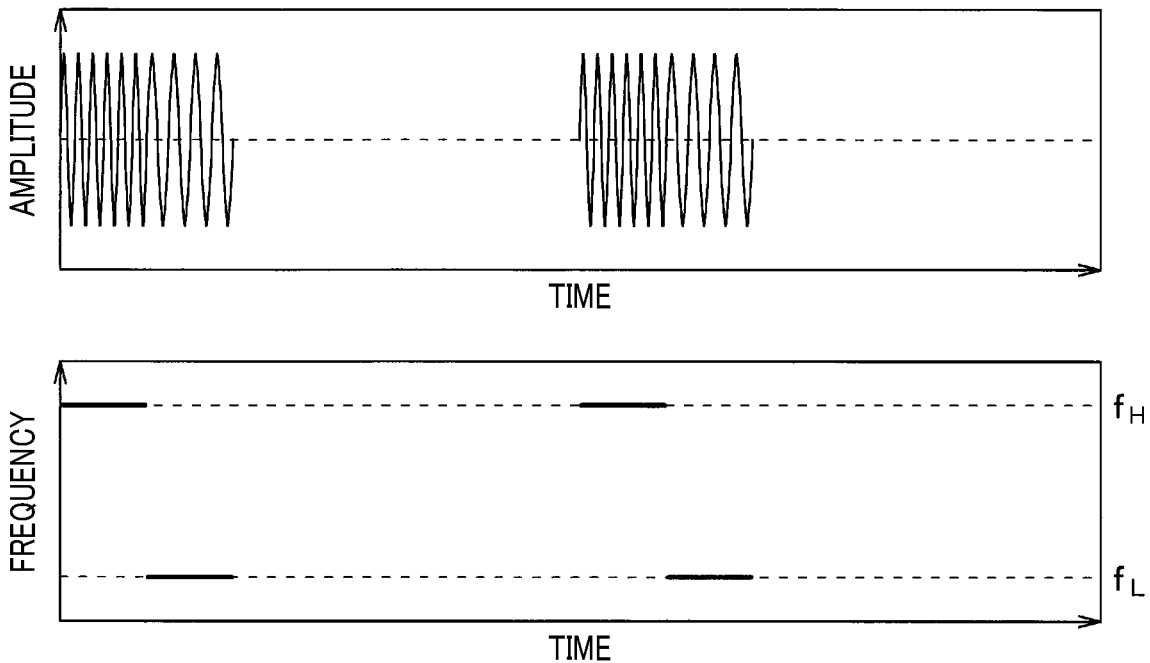
FIG. 34 is a diagram showing the drive signal according to another embodiment.

Further, drive signals that are different from those of the first embodiment may be used. For example, as shown in FIG. 34, the signal generation unit may generate a drive signal so that a signal having a frequency $f_H$ and a signal having a frequency $f_L$ are included continuously. A drive signal having the frequency $f_H$ may be generated first, or a drive signal having the frequency $f_L$ may be generated first. Further, the drive signals of frequencies $f_H$ and $f_L$ may be generated alternately, or a drive signal of one of the frequencies may be successively generated twice or more. In addition, the signal length may be different for each frequency.

Figure 32:
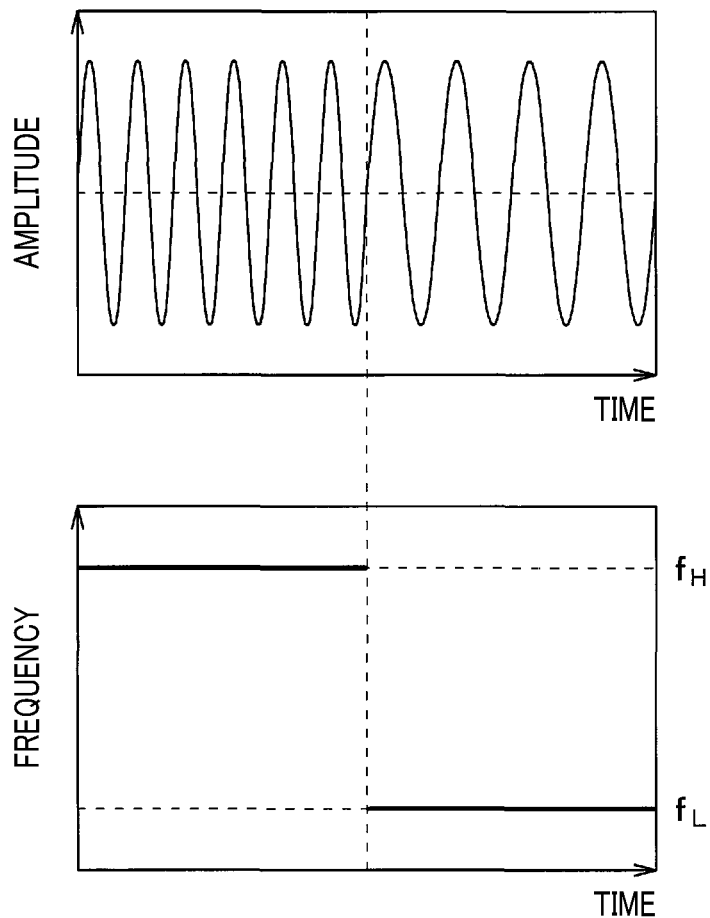
FIG. 32 is a diagram showing the drive signal according to another embodiment.
Figure 33:
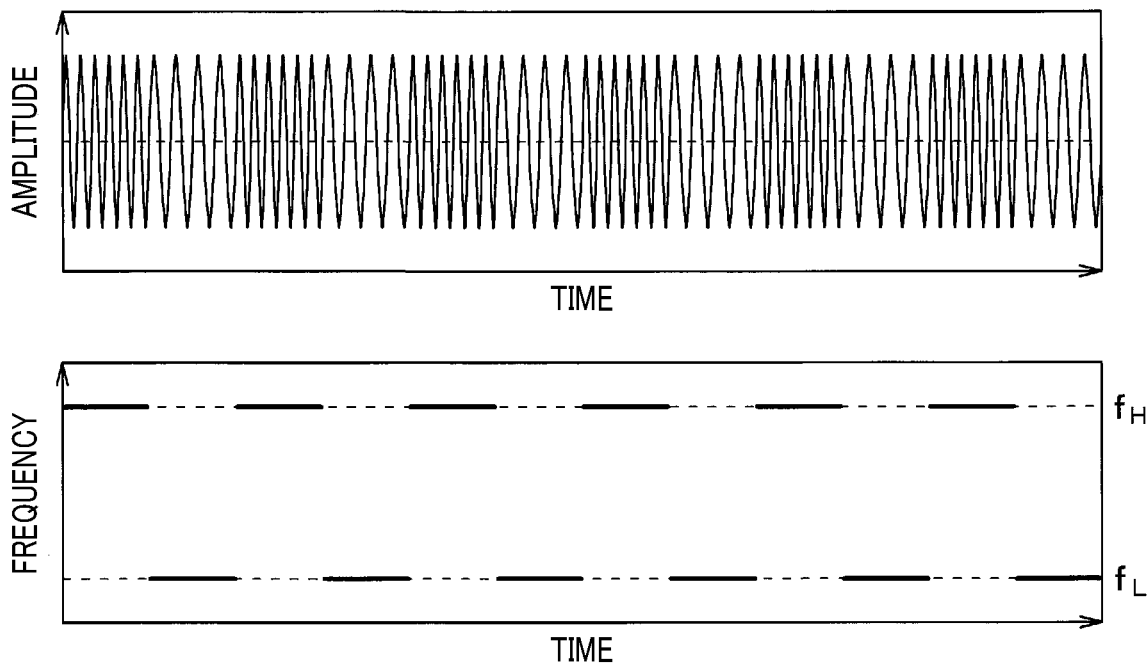
FIG. 33 is a diagram showing the drive signal according to another embodiment.

When drive signals are generated as shown in FIG. 32, the drive signals having two frequencies may either be continuously generated as shown in FIG. 33, or generated intermittently as shown in FIG. 34.

Figure 35:
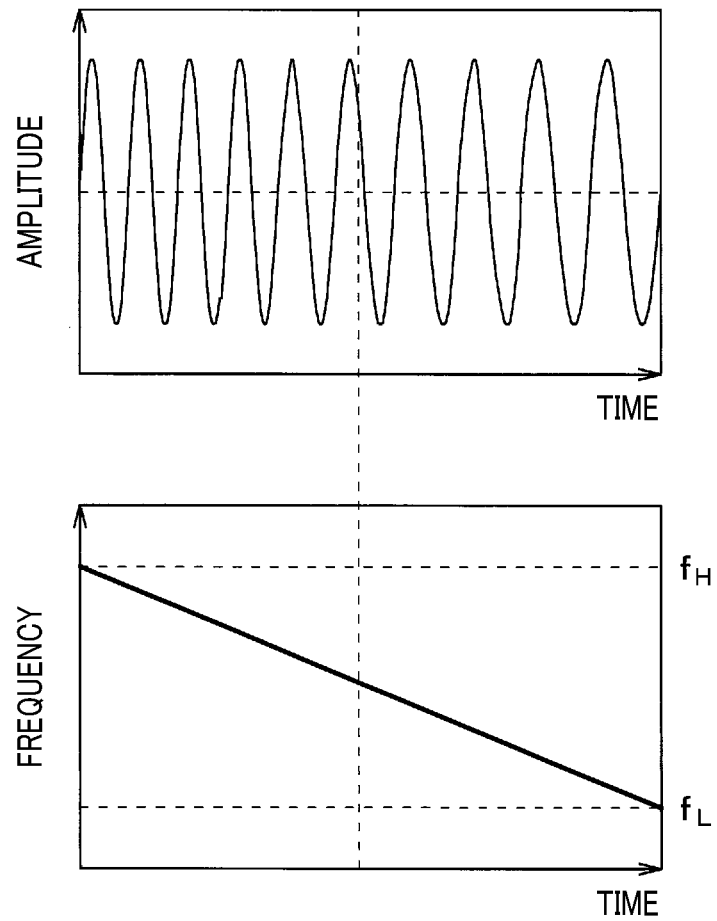
FIG. 35 is a diagram showing the drive signal according to another embodiment.
Figure 36:
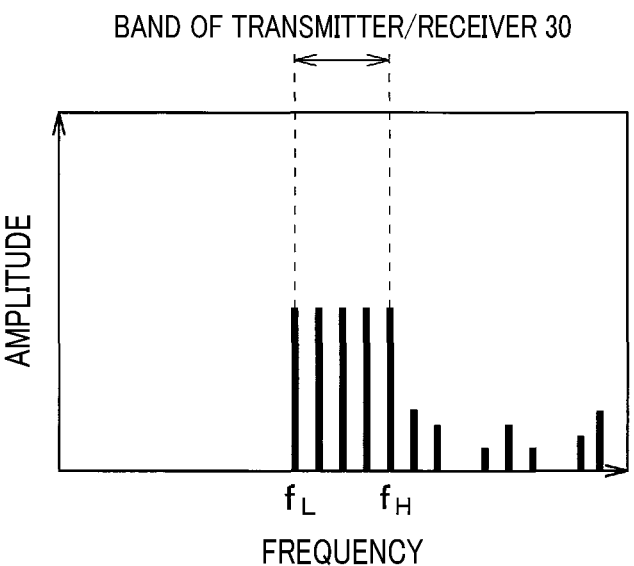
FIG. 36 is a graph showing the result of FFT analysis in the case the drive signal of FIG. 35 is used.

For example, as shown in FIG. 35, a drive signal may be generated so that it includes a chirp signal that sweeps from a certain frequency to another frequency. In this case, the result of FFT analysis will be as shown in FIG. 36, for example. Although FIG. 35 shows a down-chirp signal whose frequency decreases with time, an up-chirp signal whose frequency increases with time may also be used. When chirp signals are used, they may sweep from one of the upper and lower limits of the band of the transmitter/receiver 30 to the other, and these two frequencies may be selected as the frequencies used in the determination. This increases the difference in directivity, which allows the accuracy of object determination to improve. Note that, when a decrease in the amplitude of the search waves can be tolerated, frequencies outside the band of the transmitter/receiver 30 may be used. Further, although the frequency changes linearly in FIG. 35, the frequency may also change non-linearly.

Figure 37:
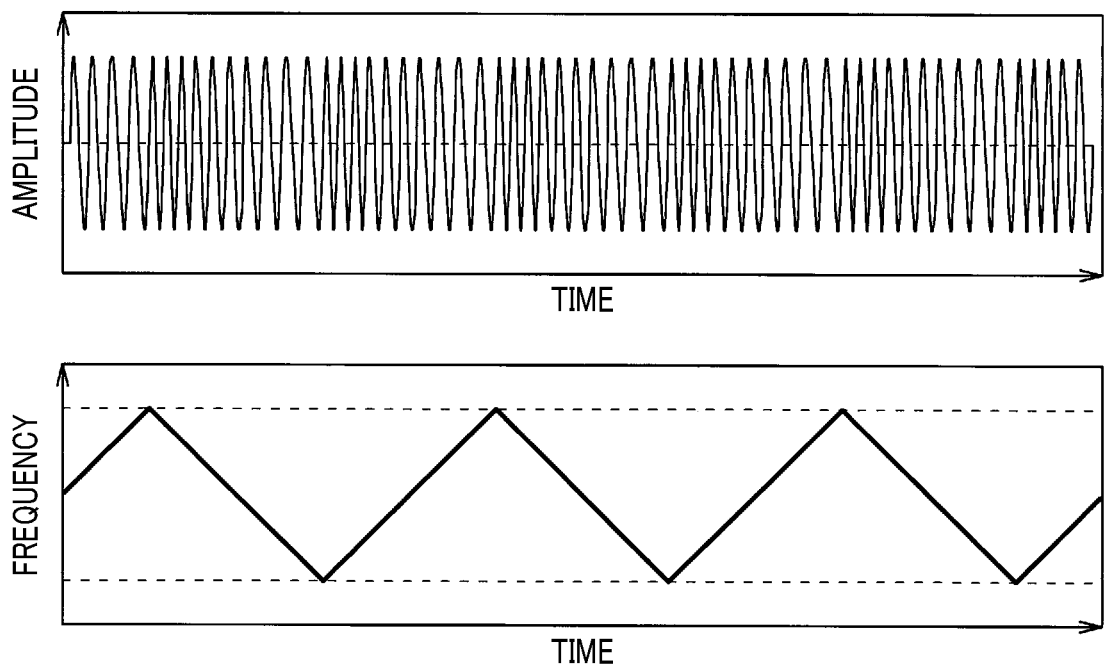
FIG. 37 is a diagram showing the drive signal according to another embodiment.
Figure 38:
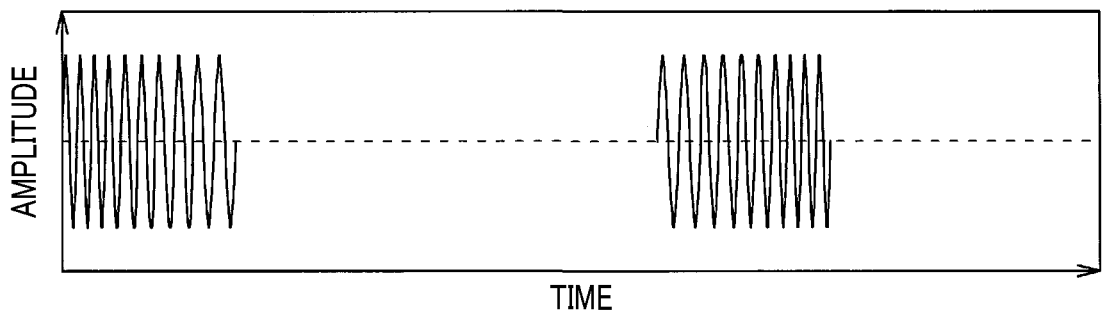
FIG. 38 is a diagram showing the drive signal according to another embodiment.
Figure 39:
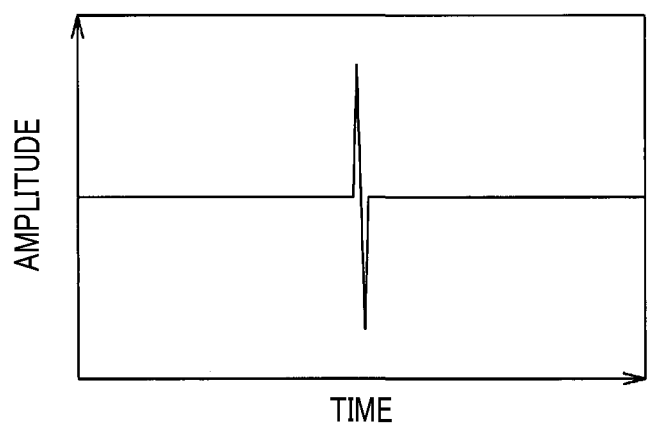
FIG. 39 is a diagram showing the drive signal according to another embodiment.
Figure 40:
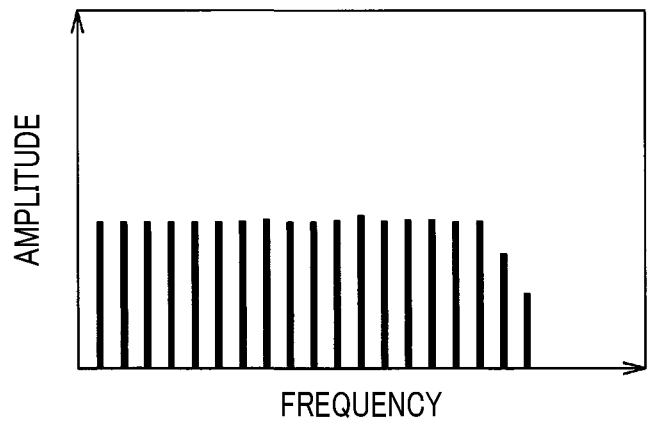
FIG. 40 is a graph showing the result of FFT analysis in the case the drive signal of FIG. 39 is used.
Figure 41:
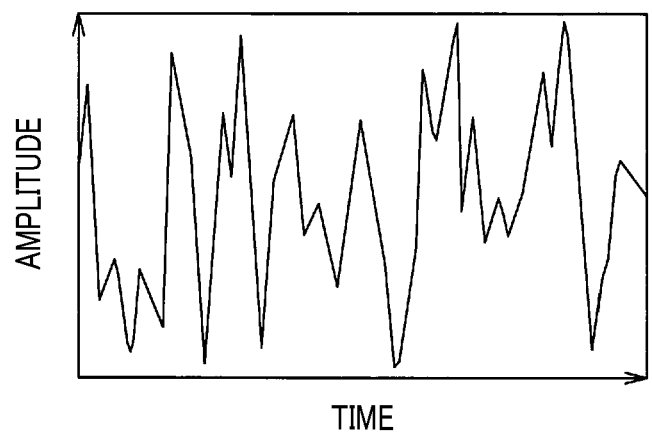
FIG. 41 is a diagram showing the drive signal according to another embodiment.
Figure 42:
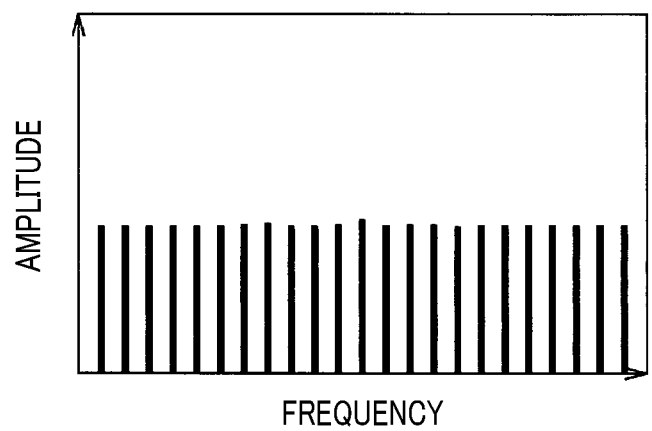
FIG. 42 is a graph showing the result of FFT analysis in the case the drive signal of FIG. 41 is used.

As another example, as shown in FIG. 37, a drive signal may be generated in which an up-chirp signal and a down-chirp signal appear alternatively and continuously. Alternatively, as shown in FIG. 38, there may be an interval before one of the two chirp signals is generated after the other chirp signal is generated. The up-chirp signal and down-chirp signal may be generated alternately, or one of them may be successively generated twice or more.

When the transmitter/receiver 30 follows the input signal well and has a wide bandwidth, signals including broadband frequency components, for example, white noise signals or impulse signals as shown in FIGS. 39 to 44 may be used as the drive signals. It is also possible to mix a white noise signal or an impulse signal to the drive signals shown in FIGS. 5 and 32 to 38. Further, the drive signal may be a signal in which two frequencies are mixed so that they interfere with each other.

In the first to seventh embodiments and the examples shown in FIGS. 32 to 34, the drive signal may be generated by combining three or more frequencies, and amplitudes corresponding to the three or more frequencies may be extracted from the received signal and compared. As with the earlier examples, the drive signal may either be generated continuously or intermittently when three or more frequencies are used. It is also possible to extract the amplitudes corresponding to three or more frequencies from the received signal and compared in the examples shown in FIGS. 35 to 42.

Figure 43:
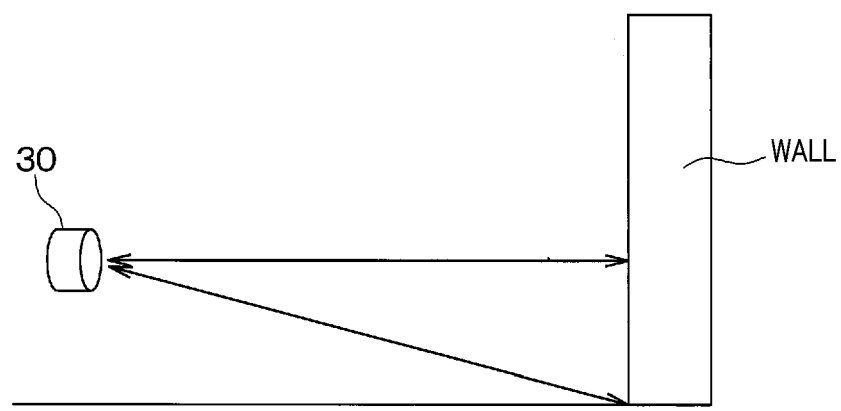
FIG. 43 is a diagram showing the propagation paths of search waves reflected by a wall.
Figure 44:
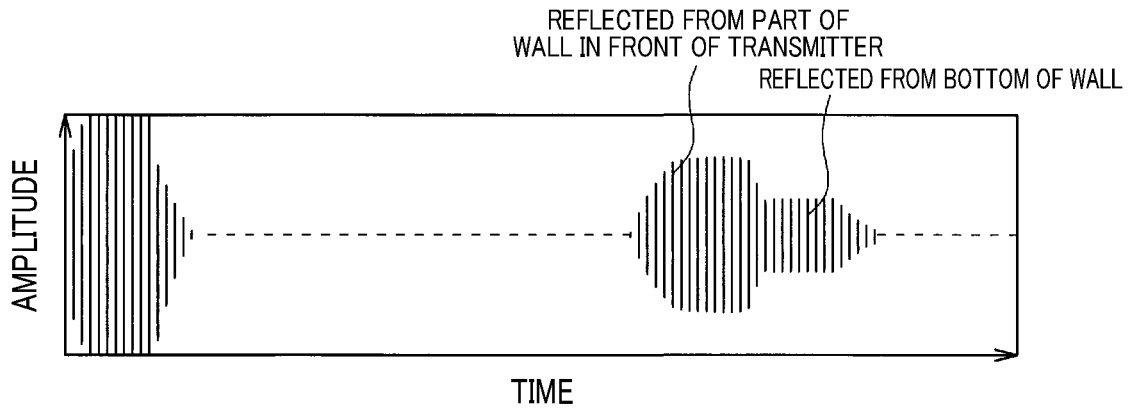
FIG. 44 is a diagram showing the amplitude of the received wave when two overlapping reflected waves are received.
Figure 45:
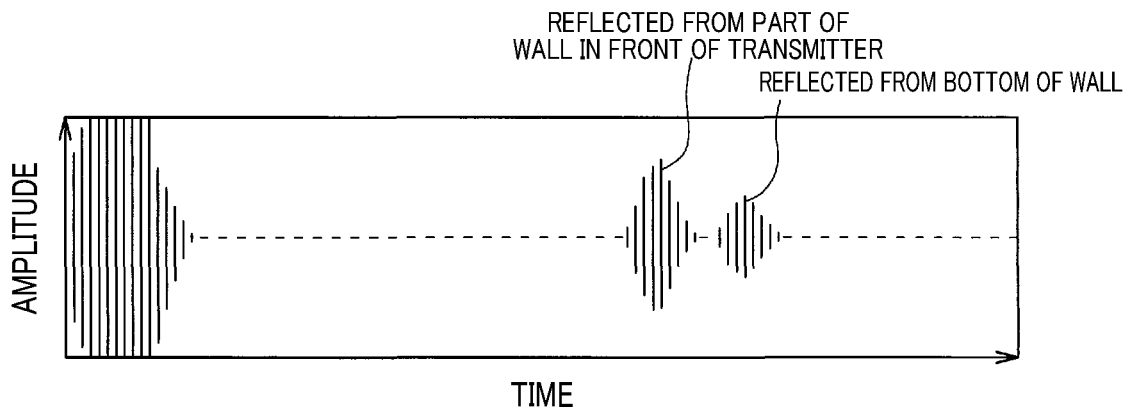
FIG. 45 is a diagram showing the amplitude of the received wave when two reflected waves are received with an interval between them.
Figure 46:
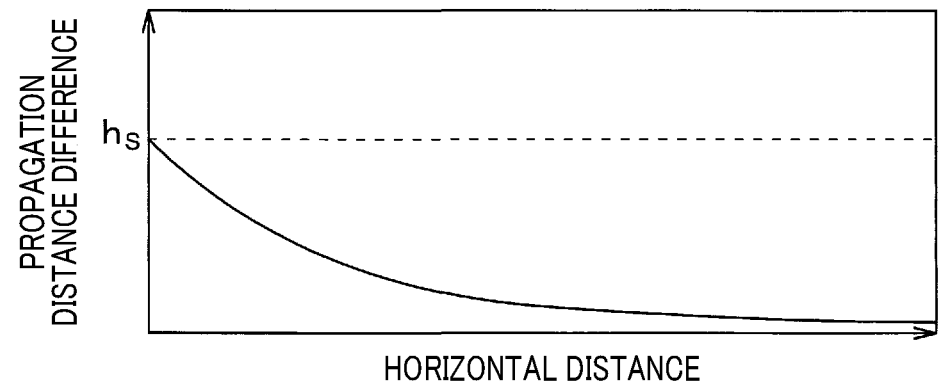
FIG. 46 is a diagram showing how the propagation distance changes depending on the path.

Note that, in order to reduce the influence of variation in amplitude due to environmental factors such as atmospheric fluctuations, it is preferable to continuously generate drive signals. On the other hand, when a search wave is transmitted toward an object such as a wall as shown in FIG. 43, a reflected wave from the part of the wall facing the transmitter/receiver 30 and a reflected wave from its bottom part are generated. When the signal length of the drive signals is large, as shown in FIG. 44, the two reflected waves may overlap each other and the determination accuracy may deteriorate. By intermittently generating drive signals and reducing the signal length, the two reflected waves will be received separately as shown in FIG. 45, which suppresses the decrease in determination accuracy due to the overlap of the reflected waves. Note that, as shown in FIG. 46, the closer the horizontal distance from the transmitter/receiver 30, the larger the difference between the propagation distances of the two reflected waves. Likewise, the higher the height at which the transmitter/receiver 30 is located, the greater the difference in propagation distance. Accordingly, it is also possible to prevent the reflected waves from overlapping by placing the transmitter/receiver 30 at a higher position.

Further, in the fourth and fifth embodiments, the frequencies of the drive signals, the frequency components used in object detection determination, and the reference value used for amplitude comparison are set based on the Doppler shift amount. However, they may also be set based on the speed of the transmission unit 10.

The control unit 40 is not limited to a well-known microcomputer provided with a CPU, ROM, RAM, I/O, and the like. That is, the control unit 40 may include a digital circuit configured to enable the above-described operations, for example, it may include an ASIC such as a gate array. ASIC is an abbreviation for Application Specific Integrated Circuit. The same applies to the signal judging unit 70 and other components.

The signal judging unit 70 is not limited to a unit that determines whether the detected object is in a certain detection range. That is, for example, the signal judging unit 70 may be adapted to determine the vertical orientation angle of the detected object. Alternatively, the signal judging unit 70 may determine the vertical orientation angle of the detected object and also determine whether the object is in a certain detection range.

Each of the above-described functional configurations and methods may be realized by a dedicated computer provided by configuring a processor and a memory programmed to execute one or more functions embodied by computer programs. Alternatively, each of the functional configurations and methods described above may be realized by a dedicated computer provided by configuring a processor with one or more dedicated hardware logic circuits.

Alternatively, each of the functional configurations and methods described above may be realized by one or more dedicated computers configured by combining a processor and a memory programmed to execute one or more functions with a processor configured by one or more hardware logic circuits. Further, the computer program may be stored in a computer-readable non-transitory tangible storage medium as instructions executed by the computer.

What is claimed is:

1. An object detection device comprising:
a non-transitory memory storing one or more computer programs; and
a processor executing the one or more computer programs to:
output drive-signal setting information to generate a drive signal that drives a transceiver to output an ultrasonic wave as a search wave;
receive a received signal corresponding to a reflected wave that is received by the transceiver, the reflected wave corresponding to the search wave that is reflected; and
perform an object detection determination based on the received signal,
wherein
the drive signal has at least two frequencies, and
the processor is configured to, in performing the object detection determination:
extract at least two amplitudes corresponding to the at least two frequencies from the received signal,
determine a ratio of the at least two amplitudes,
perform a comparison that compares the ratio of the at least two amplitudes with a reference value, and
based on a result of the comparison, determine whether the object is in a predetermined detection range and/or determine a vertical height of the object.

2. The object detection device according to claim 1, wherein the drive signal is generated intermittently.

3. The object detection device according to claim 1, wherein the drive signal is generated so that signals at the at least two frequencies are continuously included therein.

4. The object detection device according to claim 1, wherein, when the at least two frequencies are denoted by $f_L$ and $f_H$, and
the at least two amplitudes corresponding to the at least two frequencies $f_L$ and $f_H$ are denoted by $A_L$ and $A_H$, respectively,
and,
when directivity with respect to the frequency $f_L$ is wider than directivity thereof with respect to the frequency $f_H$, the object is determined to not be in a predetermined detection range when $A_H/A_L$ is smaller than a reference value, or when $A_L/A_H$ is larger than a reference value, and
when the directivity with respect to the frequency $f_L$ is narrower than the directivity thereof with respect to the frequency $f_H$, the object is determined to not be in the detection range when $A_H/A_L$ is larger than a reference value, or when $A_L/A_H$ is smaller than a reference value.

5. The object detection device according to claim 1, wherein amplitudes of components corresponding to the at least two frequencies are extracted from a part of the received signal included in a predetermined time range, and
the time range is set based on a time point at which a pattern included in the drive signal is detected from the received signal.

6. The object detection device according to claim 1, wherein a reference value used for amplitude comparison is corrected in accordance with a distance to an object calculated from a propagation time of the ultrasonic wave, or the at least two amplitudes is compared after correcting the at least two amplitudes in accordance with the distance.

7. The object detection device according to claim 1, wherein a reference value used to compare the two amplitudes is corrected in accordance with an environmental temperature, or the at least two amplitudes is compared after correcting the at least two amplitudes in accordance with the environmental temperature.

8. The object detection device according to claim 1, wherein a frequency of the drive signal, a frequency component used for determination, or a reference value used for amplitude comparison is set based on a speed of the transceiver or a Doppler shift amount of a received wave for the search wave.

9. The object detection device according to claim 1, wherein, when a resonance frequency of the transceiver is denoted by $f_0$,
one of the at least two frequencies is higher than the resonance frequency $f_0$ and the other is lower than the resonance frequency $f_0$.

10. The object detection device according to claim 1, wherein amplitudes of components corresponding to the at least two frequencies are extracted from a part of the received signal included in a predetermined time range, and
the time range is set based on a time point at which an amplitude of the received signal exceeds a predetermined amplitude threshold, a time point at which a peak amplitude of the received signal is obtained, or a time point at which the received signal starts to rise.

11. The object detection device according to claim 1, wherein the drive signal is generated so that amplitude levels of search waves corresponding to the at least two frequencies are the same in a zone in front of the transceiver, or amplitude levels of reflected waves from an object located in front of the transceiver are the same.

12. The object detection device according to claim 1, wherein the reference value decreases as a linear distance from the transceiver decreases.

13. An object detection device comprising:
a transmission unit configured to transmit an ultrasonic wave as a search wave in response to a drive signal;
a reception unit configured to receive a reflected wave corresponding to the search wave that is reflected, and generate a received signal corresponding to the reflected wave; and
a control unit comprising:
a non-transitory memory storing one or more computer programs; and
a processor executing the one or more computer programs to:
output drive-signal setting information to generate a drive signal that drives the transmission unit to output the search wave;
receive the received signal from the reception unit; and
perform an object detection determination based on the received signal,
wherein
the drive signal has at least two frequencies, and
the processor is configured to, in performing the object detection determination:
extract at least two amplitudes corresponding to the at least two frequencies from the received signal, determine a ratio of the at least two amplitudes,
perform a comparison that compares the ratio of the at least two amplitudes with a reference value, and
based on a result of the comparison, determine whether the object is in a predetermined detection range and/or determine a vertical height of the object.

\* \* \* \* \*